(12) United States Patent
Go et al.

(10) Patent No.: US 11,102,218 B2
(45) Date of Patent: Aug. 24, 2021

(54) RELAY DEVICE, DETECTION METHOD, AND DETECTION PROGRAM

(71) Applicants: Sumitomo Electric Industries, Ltd., Osaka (JP); AUTONETWORKS TECHNOLOGIES, LTD., Yokkaichi (JP); SUMITOMO WIRING SYSTEMS, LTD., Yokkaichi (JP)

(72) Inventors: Darmawan Go, Osaka (JP); Hirofumi Urayama, Osaka (JP); Takeshi Hagihara, Yokkaichi (JP); Yasuhiro Yabuuchi, Yokkaichi (JP)

(73) Assignees: Sumitomo Electric Industries, Ltd., Osaka (JP); AutoNetworks Technologies, Ltd., Yokkaichi (JP); Sumitomo Wirinq Systems, Ltd., Yokkaichi (JP)

( * ) Notice: Subject to any disclaimer, the term of this patent is extended or adjusted under 35 U.S.C. 154(b) by 109 days.

(21) Appl. No.: 16/499,691

(22) PCT Filed: Mar. 15, 2018

(86) PCT No.: PCT/JP2018/010107
§ 371 (c)(1),
(2) Date: Sep. 30, 2019

(87) PCT Pub. No.: WO2018/180518
PCT Pub. Date: Oct. 4, 2018

(65) Prior Publication Data
US 2020/0052773 A1    Feb. 13, 2020

(30) Foreign Application Priority Data
Mar. 31, 2017    (JP) .............................. JP2017-072278

(51) Int. Cl.
*H04L 29/06*    (2006.01)
*H04L 29/08*    (2006.01)
(Continued)

(52) U.S. Cl.
CPC .......... *H04L 63/1408* (2013.01); *H04L 43/08* (2013.01); *H04L 67/12* (2013.01);
(Continued)

(58) Field of Classification Search
CPC ............ H04L 63/1408; H04L 63/1458; H04L 63/1466; H04L 67/12; H04L 43/08; H04L 69/22
See application file for complete search history.

(56) References Cited

U.S. PATENT DOCUMENTS

2010/0220619 A1\* 9/2010 Chikira ............... H04L 63/1416
370/252
2014/0165191 A1 6/2014 Ahn et al.
(Continued)

FOREIGN PATENT DOCUMENTS

CN    103873319 A    6/2014
JP    2016-92645 A    5/2015

OTHER PUBLICATIONS

Park, Junhan et al., "Analysis of Slow Read DoS Attack and Countermeasures", Computer Security Symposium 2014, p. 354-361, Oct. 22-24, 2014, with English Abstract on p. 354. [Cited in Specification].

*Primary Examiner* — Kevin C. Harper
(74) *Attorney, Agent, or Firm* — Baker Botts L.L.P.; Michael A. Sartori

(57) ABSTRACT

A relay device performs relay processing of relaying data between a plurality of function units mounted on a vehicle and includes a counting unit that counts each of the numbers of relayed packets that are the numbers of packets relayed to (Continued)

respective target function units being the plurality of function units of a same type in the relay processing and a detection unit that monitors a count value of the numbers counted by the counting unit and detects unauthorized communication with the target function units based on a maximum value and a minimum value of the numbers of relayed packets counted by the counting unit.

12 Claims, 16 Drawing Sheets

(51) Int. Cl.
*H04L 12/26* (2006.01)
*H04W 4/48* (2018.01)
*G07C 5/00* (2006.01)
*H04B 7/155* (2006.01)
*H04W 12/121* (2021.01)

(52) U.S. Cl.
CPC .......... *G07C 5/008* (2013.01); *H04B 7/15521* (2013.01); *H04L 63/1466* (2013.01); *H04W 4/48* (2018.02); *H04W 12/121* (2021.01)

(56) References Cited

U.S. PATENT DOCUMENTS

| 2015/0089236 A1* | 3/2015 | Han | H04W 12/10 |
| | | | 713/181 |
| 2016/0255065 A1* | 9/2016 | Oshida | H04L 61/6022 |
| | | | 726/3 |

* cited by examiner

RELAY DEVICE, DETECTION METHOD, AND DETECTION PROGRAM

CROSS-REFERENCE TO RELATED APPLICATIONS

This application is the national phase under 35 U.S.C. § 371 of PCT International Application No. PCT/JP2018/010107 which has an International filing date of Mar. 15, 2018 and designated the United States of America.

FIELD

The present disclosure relates to a relay device, a detection method and a detection program.

The present application claims the benefit of Japanese Patent Application No. 2017-72278 filed on Mar. 31, 2017, the entire contents of which are herein incorporated by reference.

BACKGROUND

Patent Document 1 (Japanese Patent Application Laid-Open No. 2016-92645) discloses an in-vehicle communication system as described later. The in-vehicle communication system includes a gateway that relays communication between an external apparatus and an in-vehicle LAN; and a communication permission determination unit that inhibits communication between the external apparatus and the in-vehicle LAN via the gateway if it is determined that a vehicle having the in-vehicle LAN mounted therein is in a parking state based on acquired predetermined vehicle information.

Furthermore, Non-Patent Document 1 ("Analysis of Slow Read DoS attack and Countermeasures" Junhan Park et al., Computer Security Symposium 2014, October 2014, pp. 354-361) describes Slow Read DoS (Denial of Service) attack that is generally difficult to be detected since a target web server is not down.

SUMMARY (1) A relay device according to the present disclosure is a relay device that performs relay processing of relaying data between a plurality of function units mounted on a vehicle comprises: a counting unit that counts each of the numbers of relayed packets that are the numbers of packets relayed to respective target function units being the plurality of function units of a same type in the relay processing; and a detection unit that monitors a count value of the numbers counted by the counting unit and detects unauthorized communication with the target function units based on a maximum value and a minimum value of the numbers of relayed packets counted by the counting unit.

(12) A detection method according to the present disclosure is a detection method for a relay device that performs relay processing of relaying data between a plurality of function units mounted on a vehicle comprises steps of counting each of the numbers of relayed packets that are the numbers of packets relayed to respective target function units being the plurality of function units of a same type in the relay processing; and monitoring a counted count value and detecting unauthorized communication with the target function units based on a maximum value and a minimum value of the numbers of relayed packets that are counted.

(13) A detection program according to the present disclosure is a detection program used in a relay device that performs relay processing of relaying data between a plurality of function units mounted on a vehicle causing a computer to function as: a counting unit that counts each of the numbers of relayed packets that are the numbers of packets relayed to respective target function units being the plurality of function units of a same type in the relay processing; and a detection unit that monitors a count value of the numbers counted by the counting unit and detects unauthorized communication with the target function units based on a maximum value and a minimum value of the numbers of relayed packets counted by the counting unit.

One embodiment of the present disclosure may be achieved as a relay device provided with such a characteristic processing unit as well as an on-vehicle communication system provided with the relay device. Furthermore, one embodiment of the present disclosure may be achieved as a semiconductor integrated circuit that implements a part or all of the relay device.

DETAILED DESCRIPTION

Figure 1:
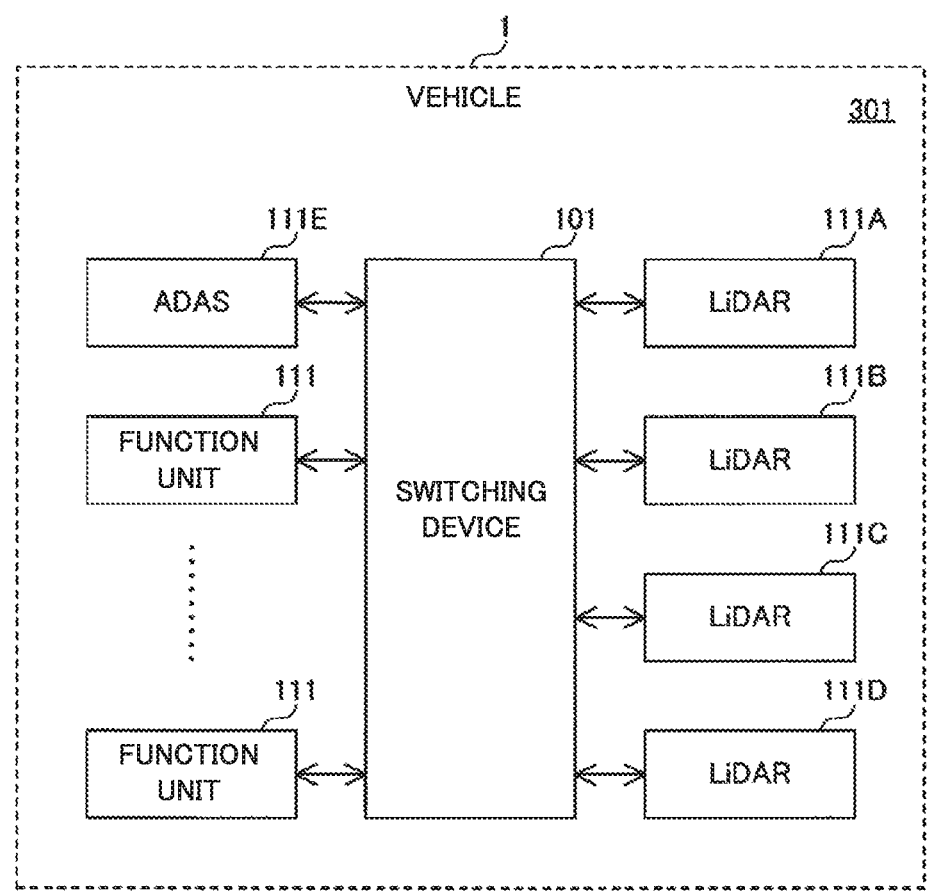
FIG. 1 illustrates the configuration of an on-vehicle communication system according to Embodiment 1 of the present disclosure.

An on-vehicle communication system for improving security in an on-vehicle network has conventionally been developed.

In the in-vehicle communication system according to Patent Document 1, communication between the in-vehicle LAN and the external apparatus through a gateway is inhibited in a parking state of the vehicle, so that unauthorized access to the in-vehicle LAN from the external apparatus through the gateway can be prevented.

In the running state of the vehicle, however, unauthorized access from the external apparatus cannot be prevented.

In the detection method described in Non-Patent Document 1, using a Transmission Control Protocol (TCP) connection and a time-out, an attack is detected.

It is, however, difficult to detect a Slow Read DoS attack not using the TCP connection with the use of the above-described method.

The present disclosure is made to solve the above-described problems, and an object is to provide a relay device, a detection method and a detection program that are able to provide good security in the on-vehicle network.

According to the present disclosure, it is possible to provide good security in the on-vehicle network.

Embodiments of the present disclosure are first listed and described.

(1) The relay device according to an aspect of the present disclosure is a relay device that performs relay processing of relaying data between a plurality of function units mounted on a vehicle comprises: a counting unit that counts each of the numbers of relayed packets that are the numbers of packets relayed to respective target function units being the plurality of function units of a same type in the relay processing; and a detection unit that monitors a count value of the numbers counted by the counting unit, and detects unauthorized communication with the target function units based on a maximum value and a minimum value of the numbers of relayed packets counted by the counting unit.

The target function units are of the same type, and it is conceivable that packets relayed to the respective target function units are the same in number. The numbers of relayed packets transmitted to the respective target function units are counted, and unauthorized communication with the target function units is detected based on the maximum value and the minimum value of the counted numbers of relayed packets. By such a configuration, unauthorized communication, such as a Slow Read DoS attack, that is difficult to be detected in the function unit located at the end in the on-vehicle network can be detected based on variation in number of relayed packets that are to be the same. Furthermore, the numbers of relayed packets are counted, and by such a configuration, unauthorized communication can be detected regardless of a communication protocol. More specifically, even if the packets to be relayed are a User Datagram Protocol (UDP) packet not using a TCP connection and a message in a Controller Area Network (CAN), a Slow Read DoS attack can be detected. In addition, the relay device is operated irrespective of a running state of the vehicle, and by such a configuration, unauthorized communication can be detected in the state where the vehicle is running as well in addition to the state where the vehicle is parked. Accordingly, good security can be provided in the on-vehicle network.

(2) Preferably, the packets are transmitted to the target function units in order, and the detection unit is able to detect unauthorized communication with the target function units other than a last one of the target function units in the order.

In the case where packets are transmitted to the respective target function units in order, a timing when the maximum value and the minimum value take the same value may occur in the absence of an unauthorized intrusion packet. In contrast, in the presence of one or more unauthorized intrusion packets transmitted to the target function units other than the last target function unit in the order, a timing when the maximum value and the minimum value take the same value does not occur. By the above-described configuration focusing on such a difference, one or more unauthorized intrusion packets transmitted to the target function units other than the last target function unit in the order can be detected.

(3) Preferably, the detection unit is able to detect the unauthorized communication if two or more packets are relayed to any one of the target function units in unauthorized communication.

If the number of unauthorized intrusion packets is small, a timing when the maximum value and the minimum value take the same value may occur even in the presence of an unauthorized intrusion packet. If, however, the number of unauthorized intrusion packets becomes larger, a timing when the maximum value and the minimum value take the same value does not occur. By the above-described configuration focusing on such a difference, an unauthorized intrusion packet transmitted to the target function units can be detected.

(4) Preferably, the target function units are function units that transmit packets to a common function unit being one of the plurality of function units.

By such a configuration, in the case where the respective target function units transmit packets to the common function unit in response to a request from the common function unit, the packets including this request are uniformly transmitted to the respective target function units. Thus, such packets including the request can be used as packets of the same number of relays to the respective target function units.

(5) Preferably, the target function units are function units satisfying at least any one of conditions that destination port numbers for the packets are same, that addresses are included in a predetermined range, that identifiers of a network to which the target function units belong are same and the target function units are defined by predetermined definition information.

Since the applications of the destination to which the above-described packets are to be transmitted are highly likely to be the same, it is considered that the above-described packets are equally transmitted to the target function units. Furthermore, since the addresses of the target function units are highly likely to be the same, it is considered that the above-described packets are equally transmitted to the target function units. Moreover, since the target function units belong to the same network, it is considered that the above-described packets are equally transmitted to the target function units. Additionally, if the target function units to which the above-described packets are to be equally transmitted are included in the definition information, for example, it is considered that the above-described packets are equally transmitted to the target function units. Thus, such packets can be used as packets of the same number of relays to the respective target function units.

(6) Preferably, the target function units include devices of a same type.

Since devices included in the target function units are highly likely to perform the same operation, it is considered that packets each including instructions to the respective devices are uniformly transmitted to the target function units. Thus, such packets can be used as packets of the same number of relays to the respective target function units.

(7) Preferably, the detection unit detects the unauthorized communication based on a change in a difference between the maximum value and the minimum value.

In the absence of an unauthorized intrusion packet, the difference decreases and reaches zero and then increases as the time passes. In contrast, in the presence of an unauthorized intrusion packet, the difference decreases and reaches a value larger than zero and then increases as the time passes. By focusing on such a temporal change of the difference, an intrusion of an unauthorized packet to the on-vehicle network can be detected.

(8) More preferably, the detection unit detects the unauthorized communication based on a value obtained when the difference is shifted from decrease to increase in the change.

By focusing on the fact that the above-described value obtained when an unauthorized packet intrudes is different from the above-described value obtained when an unauthorized packet does not intrude, unauthorized communication may easily be detected.

(9) More preferably, the detection unit determines that the unauthorized communication occurs if the differences increases before the differences reaches zero with its decreasing, in the change.

By such a configuration, the time from when an unauthorized packet intrudes to when it is determined that unauthorized communication occurs can be shortened, so that a delay of detection can be prevented.

(10) Preferably, the counting unit resets the numbers of relayed packets if the unauthorized communication is detected by the detection unit.

By such a configuration, erroneous determination of incorrectly determining that unauthorized communication occurs even though unauthorized communication does not occur can be prevented.

(11) Preferably, the packets are transmitted to the target function units in a predetermined order, and the counting unit resets the numbers of relayed packets when one of the target function units to which one of the packets is to be relayed is switched from one target function unit to another target function unit after the unauthorized communication is detected by the detection unit.

Hence, the number of relayed packets are reset at a timing when the sequence of the target function units is switched (at a timing of order break to transmit) and whereby, detection processing can be restarted in the middle of the order. That is, the detection processing can be restarted from a substantial initial state.

(12) The detection method according to the present disclosure is a detection method for a relay device that performs relay processing of relaying data between a plurality of function units mounted on a vehicle comprises steps of counting each of the numbers of relayed packets that are the numbers of packets relayed to respective target function units being the plurality of function units of a same type in the relay processing; and monitoring a counted count value and detecting unauthorized communication with the target function units based on a maximum value and a minimum value of the numbers of relayed packets that are counted.

The target function units are of the same type, and it is conceivable that packets relayed to the respective target function units are the same in number. The numbers of relayed packets transmitted to the respective target function units are counted, and unauthorized communication with the target function units is detected based on the maximum value and the minimum value of the counted numbers of relayed packets. By such a configuration, unauthorized communication, such as a Slow Read DoS attack, that is difficult to be detected in the function unit located at the end in the on-vehicle network can be detected based on variation in number of relayed packets that are to be the same. Furthermore, the numbers of relayed packets are counted, and by such a configuration, unauthorized communication can be detected regardless of a communication protocol. More specifically, even if the packets to be relayed are a UDP packet not using a TCP connection and a message in a CAN, a Slow Read DoS attack can be detected. In addition, the switching device is operated irrespective of a running state of the vehicle, and by such a configuration, unauthorized communication can be detected in the state where the vehicle is running as well in addition to the state where the vehicle is parked. Accordingly, good security can be provided in the on-vehicle network.

(13) The detection program according to the present disclosure is a detection program used in a relay device that performs relay processing of relaying data between a plurality of function units mounted on a vehicle causing a computer to function as: a counting unit that counts each of the numbers of relayed packets that are the numbers of packets relayed to respective target function units being the plurality of function units of a same type in the relay processing; and a detection unit that monitors a count value of the numbers counted by the counting unit and detects unauthorized communication with the target function units based on a maximum value and a minimum value of the numbers of relayed packets counted by the counting unit.

The target function units are of the same type, and it is conceivable that packets relayed to the respective target function units are the same in number. The numbers of relayed packets transmitted to the respective target function units are counted, and unauthorized communication with the target function units is detected based on the maximum value and the minimum value of the counted numbers of relayed packets. By such a configuration, unauthorized communication, such as a Slow Read DoS attack, that is difficult to be detected in the function unit located at the end in the on-vehicle network can be detected based on variation in number of relayed packets that are to be the same. Furthermore, the numbers of relayed packets are counted, and by such a configuration, unauthorized communication can be detected regardless of a communication protocol. More specifically, even if the packets to be relayed are a UDP packet not using a TCP connection and a message in a CAN, a Slow Read DoS attack can be detected. In addition, the relay device is operated irrespective of a running state of the vehicle, and by such a configuration, unauthorized communication can be detected in the state where the vehicle is running as well in addition to the state where the vehicle is parked. Accordingly, good security can be provided in the on-vehicle network.

The embodiments of the present disclosure will be described below with reference to the drawings thereof. It is noted that the same or corresponding parts are denoted by the same reference codes in the drawings and will not be repeated here. Furthermore, at least parts of the embodiments described below may arbitrarily be combined.

Embodiment 1

[Configuration and Basic Operation]

FIG. 1 illustrates the configuration of an on-vehicle communication system according to Embodiment 1 of the present disclosure.

Referring to FIG. 1, an on-vehicle communication system 301 includes a switching device 101 and a plurality of function units 111. The on-vehicle communication system 301 is mounted on a vehicle 1.

In this example, light detection and rangings (LiDARs) 111A, 111B, 111C, 111D are examples of multiple function units 111 (hereinafter, also referred to as target function units) of the same type. An advanced driver assistance system (ADAS) 111E is one example of another function unit 111.

Hereinafter, each of the LiDARs 111A, 111B, 111C and 111D is also referred to as a LiDAR 111.

The LiDARs 111A-111D include devices of the same type such as laser devices for each emitting a laser beam and light receiving elements for each receiving light scattered from an object, for example.

The LiDARs 111A, 111B, 111C and 111D are respectively mounted on the left part, the right part, the front part and the rear part of the vehicle 1 of their own, and able to detect objects positioned on the left, the right, the front and the rear of the vehicle 1.

The LiDAR 111 measures the presence or absence of an object around the vehicle 1 in response to a measurement request from the ADAS 111E.

The ADAS 111E can assist running of the vehicle 1, for example. More specifically, the ADAS 111E acquires from the respective LiDARs 111 measurement results obtained by the respective LiDARs 111, and assists running based on the acquired measurement results.

Noted that the function unit 111 may be a telematics communication unit (TCU), a gateway device, a human machine interface, a camera, a millimeter wave sensor, a navigation device, and so on without being limited to the LiDAR 111 and the ADAS 111E.

The connection between the switching device 101 and each of the function units 111 in the on-vehicle network is fixed, for example.

The switching device 101 is connected to the function unit 111 through a cable used specifically for on-vehicle Ethernet (registered trademark) communication (hereinafter, also referred to as an Ethernet cable).

The switching device 101 and the function unit 111 can communicate with each other through the Ethernet cable, for example.

Specifically, the switching device 101 and the function unit 111 can exchange information using, for example, an Ethernet frame complying with IEEE802.3.

The switching device 101 performs relay processing for relaying data between the multiple function units 111 mounted on the vehicle 1.

Specifically, the switching device 101 relays an Ethernet frame transmitted from the ADAS 111E to each of the LiDARs 111A-111D, for example. The switching device 101 also relays an Ethernet frame from each of the LiDARs 111A-111D to the ADAS 111E.

More specifically, the ADAS 111E creates four IP packets the destination of which are the respective LiDARs 111A, 111B, 111C and 111D every predetermined acquisition period.

Hereafter, the IP packets the destination of which are the LiDARs 111A, 111B, 111C and 111D are also referred to as target packets A, B, C and D, respectively. Furthermore, each of the target packets A, B, C and D may also be referred to as a target packet.

The target packets A, B, C and D respectively include the IP addresses of the LiDARs 111A, 111B, 111C and 111D as destination IP addresses. Each of the target packets includes the IP address of the ADAS 111 as a source IP address.

Moreover, each of the target packets includes, for example, an UDP packet. The header and the payload of each of the UDP packets include the same destination port number, a measurement request and so on.

The ADAS 111E creates four Ethernet frames including the respective target packets A, B, C and D.

The four Ethernet frames including the respective target packets A, B, C and D include media access control (MAC) addresses of the LiDARs 111A, 111B, 111C and 111D as destination MAC addresses, respectively.

Additionally, these four Ethernet frames each include the MAC address of the ADAS 111E as a source MAC address.

The target packets are transmitted to the respective target function units in a predetermined order, for example. In this example, the ADAS 111E respectively transmits the four Ethernet frames including the respective target packets A, B, C and D to the LiDARs 111A, 111B, 111C and 111D in this order via the switching device 101. Hereafter, this transmission pattern will also be referred to as a single packet pattern.

Each of the target function units is the function unit 111 having the same reception port number of the packet, for example. In this example, the LiDARs 111A, 111B, 111C and 111D have a common application for operating the laser devices, the light receiving elements and so on. The destination of the UDP packet transmitted from the ADAS 111E is this application. That is, the destination address indicated by the destination port number included in the header of the UDP packet is this application.

The application in the LiDAR 111A acquires a measurement request included in the Ethernet frame received by its own LiDAR 111A from the ADAS 111E.

The LiDAR 111A then controls the laser device, the light receiving element and so on according to the acquired measurement request to thereby measure the presence or absence of an object around the vehicle 1 and creates a UDP packet including a measurement result.

The application in each of the LiDARs 111B, 111C and 111D also performs similar processing to the application in the LiDAR 111A.

Each of the target function units transmits a packet to a common function unit 111 being one of the plurality of function units 111, for example. In this example, the LiDARs 111A, 111B, 111C and 111D each transmit a UDP packet including the measurement result to the ADAS 111E.

More specifically, the LiDAR 111A stores an UDP packet created according to the application in an IP packet, then creates an Ethernet frame including this IP packet, and transmits the created Ethernet frame to the ADAS 111E via the switching device 101.

The LiDARs 111B, 111C and 111D each create an Ethernet frame and transmit the created Ethernet frame to the ADAS 111E via the switching device 101 similarly to the LiDAR 111A.

[Problem]

In the on-vehicle communication system 301, in the case where a part of communication paths from the ADAS 111E to the LiDARs 111A-111D are interrupted due to unauthorized communication, for example, a part of the UDP packets transmitted from the ADAS 111E to the LiDARs 111A-111D may be missing.

To address this problem, for example, a communication timeout is set to the LiDAR 111 at the end, and based on which one is larger between the elapsed time from when the UDP packet has been received most recently and the communication timeout, the missing of the UDP packet may be detected.

Furthermore, the LiDAR 111 may come under a DoS attack caused by the UDP packets transmitted highly frequently. Specifically, in an on-vehicle communication network where one of the function units 111 in the on-vehicle communication system 301 is replaced with a fake function unit for making a DoS attack (hereinafter, referred to as a fake function unit), the LiDAR 111 comes under a DoS attack by the fake function unit.

To address such a Dos attack, for example, conceivable is a method of setting to the switching device 101 and the LiDAR 111 a threshold for a reception frequency of a UDP packet and detecting a DoS attack based on whether the reception frequency of the UDP packet is equal to or larger than the threshold.

If, however, the fake function unit transmits an unauthorized UDP packet at a frequency approximately the same as the frequency at which the ADAS 111E makes an authorized measurement request to each of the LiDARs 111, for example, the reception frequencies of the UDP packets by the switching device 101 and the LiDAR 111 are highly likely to be smaller than the above-mentioned threshold.

Detection of such a slow DoS attack using the above-mentioned method is difficult, and thus a technique of detecting a slow DoS attack is required.

Hence, the switching device according to Embodiment 1 of the present disclosure solves these problems by the following configuration and operation.

[Configuration of the Switching Device 101]

Figure 2:
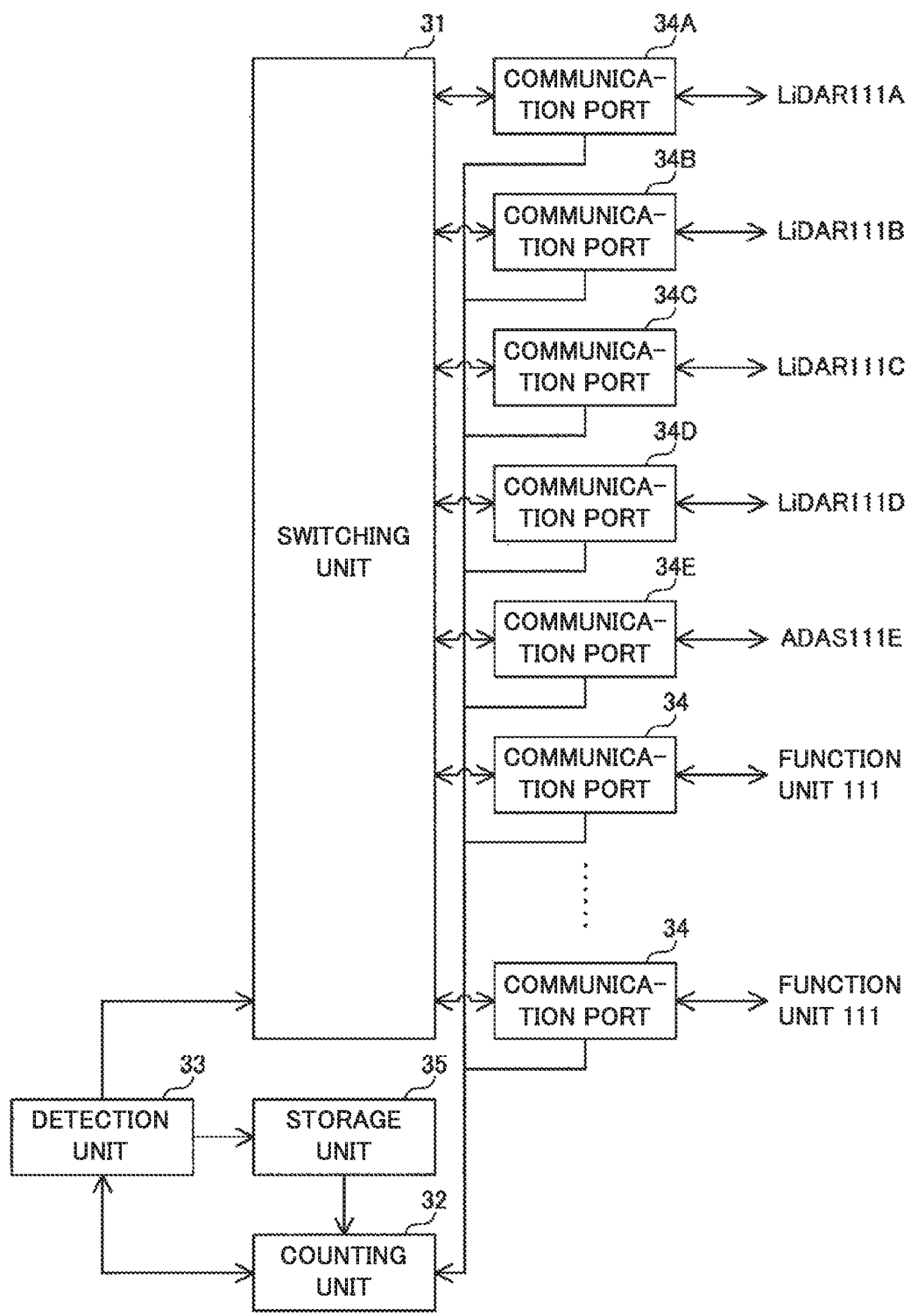
FIG. 2 illustrates the configuration of a switching device in the on-vehicle communication system according to Embodiment 1 of the present disclosure.

FIG. 2 illustrates the configuration of the switching device in the on-vehicle communication system according to Embodiment 1 of the present disclosure.

Referring to FIG. 2, the switching device (relay device) 101 includes a switching unit 31, a counting unit 32, a detection unit 33, multiple communication ports 34 and a storage unit 35.

The communication ports 34 are connected to the function units 111 through Ethernet cables. Each of the communication ports 34 is assigned with an inherent port number.

For the sake of simplicity, the communication ports 34 connected to the LiDARs 111A, 111B, 111C and 111D through the Ethernet cables are also referred to as communication ports 34A, 34B, 34C and 34D, respectively. Furthermore, the communication port 34 connected to the ADAS 111E through the Ethernet cable is also referred to as a communication port 34E.

The communication port 34, for example, receives an Ethernet frame from the function unit 111 to be connect thereto and performs frame processing such as filtering processing or the like of the received Ethernet frame. The communication port 34 then outputs the processed Ethernet frame to the switching unit 31.

The communication port 34 further receives an Ethernet frame from the switching unit 31 and transmits the received Ethernet frame to the function unit 111 to be connected thereto.

The switching unit 31 operates as an L2 switch and performs relay processing of an Ethernet frame.

More specifically, when receiving an Ethernet frame from the communication port 34, the switching unit 31 refers to a destination MAC address included in the received Ethernet frame.

The switching unit 31 holds an address resolution logic (ARL) table which shows, for example, the correspondences between the destination MAC addresses and the port numbers of the communication ports 34 to which the frame is output.

The contents of the ARL table are set in advance by the user, for example, based on the fixed connection as described above.

The switching unit 31 acquires a port number corresponding to the destination MAC address that has been referred to from the ARL table, and transmits the received Ethernet frame to the function unit 111 via the communication port 34 corresponding to the acquired port number.

Note that the switching unit 31 may be configured to be able to operate as a layer 3 (L3) switch as well.

Figure 3:
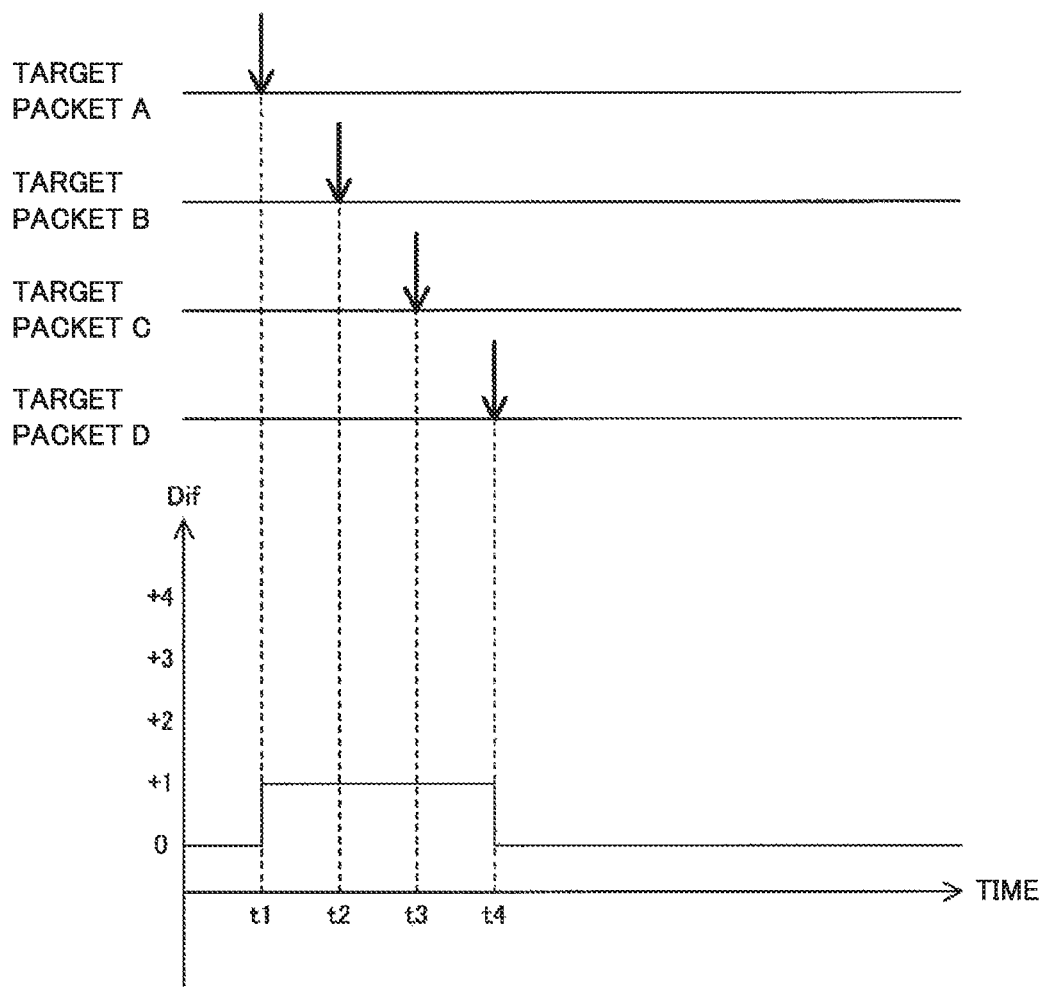
FIG. 3 illustrates one example of the temporal change of a difference if the switching device according to Embodiment 1 of the present disclosure relays each of normal target packets.

FIG. 3 illustrates one example of the temporal change of a difference if the switching device according to Embodiment 1 of the present disclosure relays each of the normal target packets. It is noted that, in FIG. 3, the horizontal axis represents time while the vertical axis represents a difference Dif.

Referring to FIGS. 1-3, in the storage unit 35 of the switching device 101, a configuration file created by the user, for example, is registered. The configuration file includes the conditions of packets to be counted by the counting unit 32.

More specifically, the configuration file includes the conditions based on the port number of a communication port 34 to be monitored, the source IP address and the destination IP address of an IP packet, a communication protocol number, a source port number and a destination port number of a UDP packet or a TCP packet, the source MAC address and the destination MAC address of an Ethernet frame, and so on.

In this example, the configuration file includes conditions CA-CD. The condition CA is that a packet including the IP address of the ADAS 111 as a source IP address and No. 2345 as a destination port number is transmitted from the communication port 34A. Here, the No. 2345 is one example of the destination port number included in each of the target packets A, B, C and D.

The condition CB is that a packet including the IP address of the ADAS 111 as a source IP address and No. 2345 as a destination port number is transmitted from the communication port 34B.

The condition CC is that a packet including the IP address of the ADAS 111 as a source IP address and No. 2345 as a destination port number is transmitted from the communication port 34C.

The condition CD is that a packet including the IP address of the ADAS 111 as a source IP address and No. 2345 as a destination port number is transmitted from the communication port 34D.

The counting unit 32 counts the number of relayed packets that are the number of packets relayed to each of the target function units in the relay processing.

More specifically, the counting unit 32 counts the numbers of packets transmitted and received through each of the communication ports 34 according to the content of the configuration file registered in the storage unit 35.

In this example, the counting unit 32 counts the numbers of the target packets A, B, C and D transmitted from the communication ports 34A, 34B, 34C and 34D to the LiDARs 111A, 111B, 111C and 111D using the conditions CA, CB, CC and CD included in the configuration file, respectively.

The counting unit 32 also counts the number of unauthorized intrusion packets disguised as any one of the target packets A, B, C and D transmitted from the fake function unit to the LiDAR 111.

More specifically, the counting unit 32 holds four counters for counting count values NA, NB, NC and ND, respectively.

Here, the count value NA represents the sum of the number of target packets A and the number of unauthorized intrusion packets disguised as target packets A. The count value NB represents the sum of the number of target packets B and the number of unauthorized intrusion packets disguised as target packets B. The count value NC represents the sum of the number of target packets C and the number of unauthorized intrusion packets disguised as target packets C. The count value ND represents the sum of the number of target packets D and the number of unauthorized intrusion packets disguised as target packets D.

Hereafter, the count values NA, NB, NC and ND may collectively be represented as an overall count value (NA, NB, NC, ND) as well. The overall count value is (0, 0, 0, 0) at an initial state.

The counting unit 32 increments the count value NA when the communication port 34A transmits the target packet A to the LiDAR 111A at a timing t1. Here, the overall count value is (1, 0, 0, 0).

The detection unit 33 monitors the count value of the counting unit 32. More specifically, the detection unit 33 monitors the temporal change of the difference Dif between the maximum value and the minimum value of the numbers of relayed packets counted by the counting unit 32, for example.

Specifically, the detection unit 33 monitors the overall count value by the counting unit 32 and calculates a difference Dif between the maximum value and the minimum value every time the overall count value is updated.

More specifically, the detection unit 33 respectively acquires one and zero as a maximum value and a minimum value and calculates one as a difference Dif when the overall count value is updated to (1, 0, 0, 0) at the timing t1.

Next, the counting unit 32 increments the count value NB when the communication port 34A transmits the target packet B to the LiDAR 111B at a timing t2.

The detection unit 33 respectively acquires one and zero as a maximum value and a minimum value and calculates one as a difference Dif when the overall count value is updated to (1, 1, 0, 0) at the timing t2.

Subsequently, the counting unit 32 increments the count value NC when the communication port 34C transmits the target packet C to the LiDAR 111C at a timing t3.

The detection unit 33 respectively acquires one and zero as a maximum value and a minimum value and calculates one as a difference Dif when the overall count value is updated to (1, 1, 1, 0) at the timing t3.

Then, the counting unit 32 increments the count value ND when the communication port 34D transmits the target packet D to the LiDAR 111D at a timing t4.

The detection unit 33 respectively acquires one and one as a maximum value and a minimum value and calculates zero as a difference Dif when the overall count value is updated to (1, 1, 1, 1) at the timing t4.

The detection unit 33 detects unauthorized communication with the target function unit based on the maximum value and the minimum value of the numbers of relayed packets counted by the counting unit 32.

More specifically, the detection unit 33 can detect unauthorized communication with the target function units other than the target function unit that is last one of a predetermined order, for example.

In this example, since the target packets A, B, C and D are transmitted by a single packet pattern, the detection unit 33 can detect one or more unauthorized intrusion packets transmitted to the LiDARs 111A-111C other than the LiDAR 111D to which the target packet D is to be transmitted. Here, detection of unauthorized communication with the LiDAR 111D will be described later.

The detection unit 33 detects unauthorized communication based on the temporal change of the difference Dif between the maximum value and the minimum value, for example.

Specifically, the detection unit 33 detects unauthorized communication based on the value obtained when the difference Dif is shifted from decrease to increase in the temporal change of the difference Dif, for example.

More specifically, if the differences Dif increases before the differences Dif reaches zero with its decreasing, in the temporal change of the difference Dif, the detection unit 33 determines that unauthorized communication has occurred.

In the case of the temporal change illustrated in FIG. 3, the difference Dif does not increase before the differences Dif reaches zero with its decreasing, and thus the detection unit 33 determines that unauthorized communication has not occurred.

Figure 4:
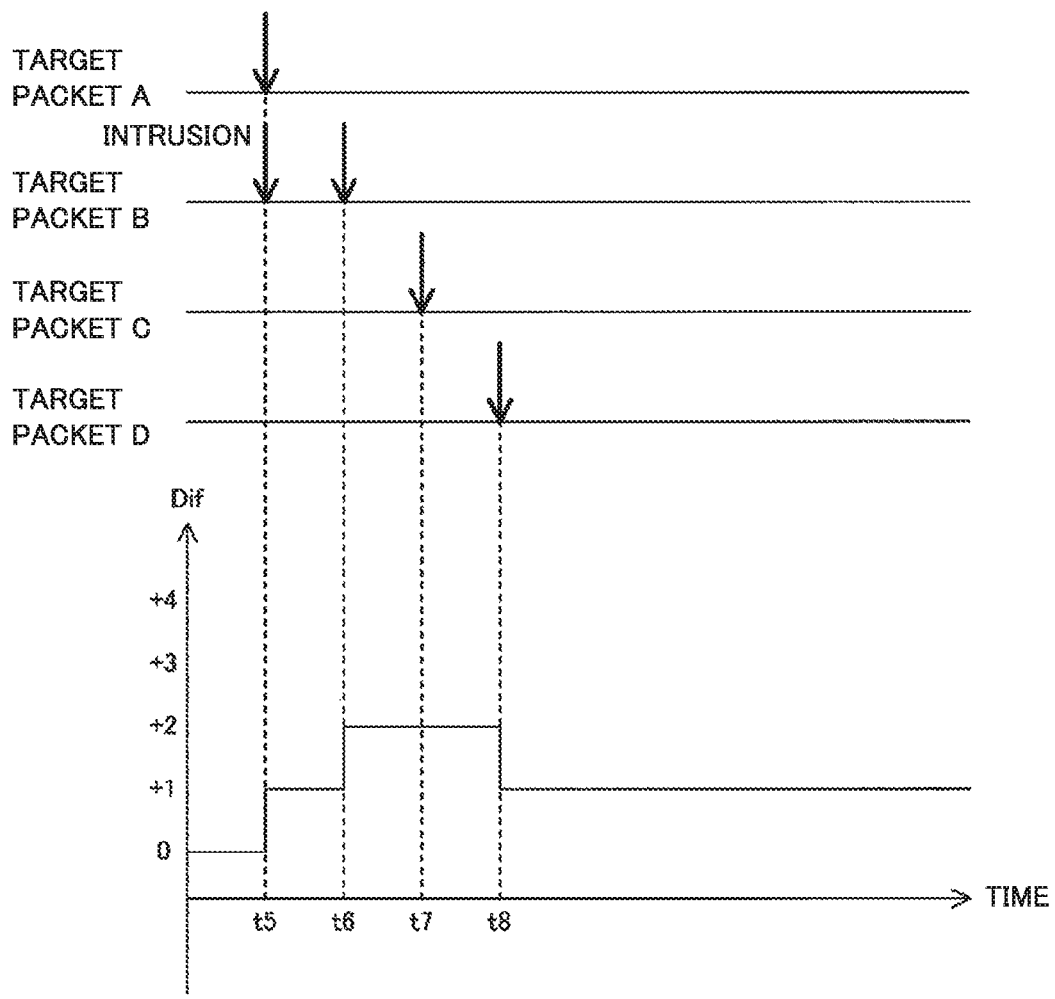
FIG. 4 illustrates one example of the temporal change of the difference if the switching device according to Embodiment 1 of the present disclosure relays each of the normal target packets and an unauthorized intrusion packet.

FIG. 4 illustrates one example of the temporal change of the difference if the switching device according to Embodiment 1 of the present disclosure relays each of the normal target packets and an unauthorized intrusion packet.

It is noted that the way of viewing FIG. 4 is similar to that of FIG. 3. FIG. 4 further shows a situation of relaying by the switching device 101 at timings after the timing t4 illustrated in FIG. 3.

Referring to FIGS. 1, 2 and 4, the ADAS 111E transmits target packets A, B, C and D in the single packet pattern.

Furthermore, the fake function unit transmits an unauthorized intrusion packet to the LiDAR 111B via the switching device 101.

The counting unit 32 in the switching device 101 performs the following processing when the communication ports 34A and 34B respectively transmit the target packet A and an unauthorized intrusion packet addressed to the LiDAR 111B at a timing t5.

That is, the counting unit 32 increments the count value NA and the count value NB. Here, the overall count value is (2, 2, 1, 1).

The detection unit 33 respectively acquires two and one as a maximum value and a minimum value and calculates one as a difference Dif when the overall count value is updated to (2, 2, 1, 1) at the timing t5.

Then, the counting unit 32 increments the count value NB when the communication port 34B transmits the target packet B at a timing t6.

The detection unit 33 respectively acquires three and one as a maximum value and a minimum value and calculates two as a difference Dif when the overall count value is updated to (2, 3, 1, 1) at the timing t6.

Subsequently, the counting unit 32 increments the count value NC when the communication port 34C transmits the target packet C at a timing t7.

The detection unit 33 respectively acquires three and one as a maximum value and a minimum value and calculates two as a difference Dif when the overall count value is updated to (2, 3, 2, 1) at the timing t7.

Next, the counting unit 32 increments the count value ND when the communication port 34D transmits the target packet D at a timing t8.

The detection unit 33 respectively acquires three and two as a maximum value and a minimum value and calculates one as a difference Dif when the overall count value is updated to (2, 3, 2, 2) at the timing t8.

In the case of the temporal change illustrated in FIG. 4, the difference Dift does not increase before the differences Dif reaches zero with its decreasing, and thus the detection unit 33 determines that unauthorized communication has not occurred.

Figure 5:
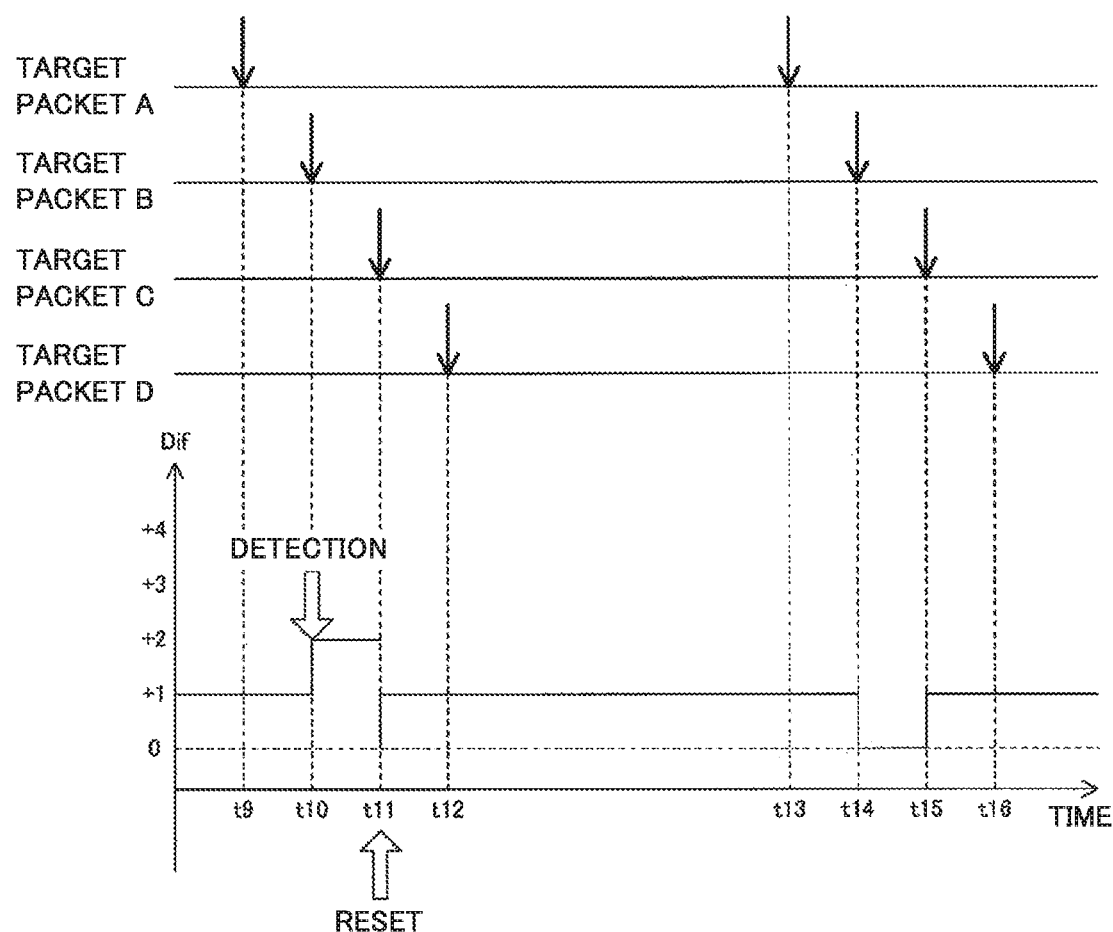
FIG. 5 illustrates one example of the temporal change of the difference if the switching device according to Embodiment 1 of the present disclosure detects an unauthorized intrusion.

FIG. 5 illustrates one example of the temporal change of the difference if the switching device according to Embodiment 1 of the present disclosure detects an unauthorized intrusion.

Note that the way of viewing FIG. 5 is similar to that of FIG. 3. FIG. 5 further shows a situation of relaying by the switching device 101 at timings after the timing 8 illustrated in FIG. 4. FIG. 5 illustrates detection of unauthorized communication with the LiDAR 111B (see FIG. 4), while the same applies to detection of unauthorized communication with each of the LiDARs 111A and 111C.

Referring to FIGS. 1, 2 and 5, the ADAS 111E transmits target packets A, B, C and D in the single packet pattern.

The counting unit 32 in the switching device 101 increments the count value NA when the communication ports 34A transmits the target packet A at a timing t9. Here, the overall count value is (3, 3, 2, 2).

The detection unit 33 respectively acquires three and two as a maximum value and a minimum value and calculates one as a difference Dif when the overall count value is updated to (3, 3, 2, 2) at the timing t9.

Then, the counting unit 32 increments the count value NB when the communication port 34B transmits the target packet B at a timing t10.

The detection unit 33 respectively acquires four and two as a maximum value and a minimum value and calculates two as a difference Dif when the overall count value is updated to (3, 4, 2, 2) at the timing t10.

The detection unit 33 determines that unauthorized communication has occurred since the difference Dif increases before the differences Dif reaches zero with its decreasing at the timing t10.

When detecting the unauthorized communication, the detection unit 33 performs detection result processing of storing a detection result in the storage unit 35 and transmitting an Ethernet frame including the detection result to a server outside the vehicle 1 via the switching unit 31, for example. The server is for collecting information concerning unauthorized communication in the vehicle 1, for example, and is administered by the producer or the like of the vehicle 1.

Furthermore, when detecting the unauthorized communication, the detection unit 33 outputs a reset instruction for resetting the count values NA-ND of the counting unit 32 to the counting unit 32.

The counting unit 32 resets the numbers of relayed packets if unauthorized communication is detected by the detection unit 33, for example.

Specifically, after the detection unit 33 detects the unauthorized communication, for example, the counting unit 32 resets the numbers of relayed packets at a time when the target function unit to which a packet is to be relayed is switched.

More specifically, when receiving the reset instruction from the detection unit 33, the counting unit 32 shifts the state to, for example, a reset preparation state according to the received reset instruction.

Here, since the target packet transmitted most recently by the switching device 101 is the target packet B, if its own switching device 101 transmits a target packet different from the target packet B, the counting unit 32 resets the count values NA-ND before incrementing the count value of the corresponding transmission counter.

In contrast thereto, if its own switching device 101 transmits a new target packet B, the counting unit 32 increments the count value of the transmission counter of the target packet B while not resetting the count values NA-ND.

Next, when the communication port 34C transmits the target packet C at a timing t11, the counting unit 32 performs the following processing since the target packet C different from the target packet B is transmitted in the reset preparation state.

That is, the counting unit 32 resets the overall count value to (0, 0, 0, 0) from (3, 4, 2, 2) and shifts the state from the reset preparation state to a normal state.

Then, the counting unit 32 increments the count value NC. Here, the overall count value is (0, 0, 1, 0).

The detection unit 33 respectively acquires one and zero as a maximum value and a minimum value and calculates one as a difference Dif when the overall count value is updated to (0, 0, 1, 0) at the timing t11.

Subsequently, the counting unit 32 increments the count value ND when the communication port 34D transmits the target packet D at a timing t12.

The detection unit 33 respectively acquires one and zero as a maximum value and a minimum value and calculates one as a difference Dif when the overall count value is updated to (0, 0, 1, 1) at the timing t12.

The ADAS 111E transmits new target packets A, B, C and D at timings after the timing t12 in the single packet pattern.

When the communication ports 34A, 34B, 34C and 34D respectively transmit the target packets A, B, C and D at timings t13, t14, t15 and t16, the counting unit 32 increments the respective count values NA, NB, NC and ND.

The overall count values are (1, 0, 1, 1), (1, 1, 1, 1), (1, 1, 2, 1) and (1, 1, 2, 2) at the respective timings t13, t14, t15 and t16.

When the overall count values are updated at the respective timings t13, t14, t15 and t16, the detection unit 33 calculates 1, 0, 1 and 1 as differences Dif.

The detection unit 33 determines that unauthorized communication has not occurred since the difference Dif does not increase before the differences Dif reaches zero with its decreasing at the timings t13-t16.

[Detection of Unauthorized Communication with LiDAR 111D in Single Packet Pattern]

Figure 6:
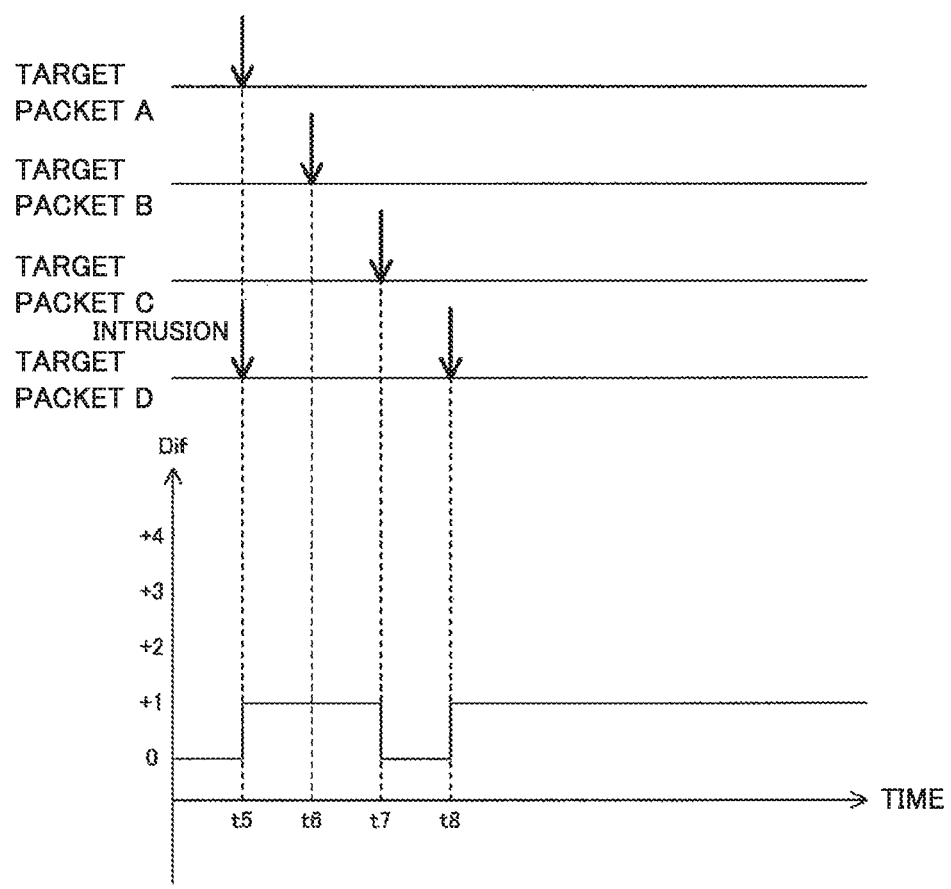
FIG. 6 illustrates one example of the temporal change of a difference if the switching device according to Embodiment 1 of the present disclosure relays each of the normal target packets and an unauthorized intrusion packet.

FIG. 6 illustrates one example of the temporal change of a difference if the switching device according to Embodiment 1 of the present disclosure relays each of the normal target packets and an unauthorized intrusion packet.

It is noted that the way of viewing FIG. 6 is similar to that of FIG. 3. FIG. 6 further shows a situation of relaying by the switching device 101 at timings after the timing t4 illustrated in FIG. 3.

Referring to FIGS. 1, 2 and 6, the ADAS 111E transmits target packets A, B, C and D in the single packet pattern.

Furthermore, the fake function unit transmits an unauthorized intrusion packet to the LiDAR 111D via the switching device 101.

The detection unit 33 can detect unauthorized communication if two or more packets are relayed to any one of the target function units in the unauthorized communication.

More specifically, the counting unit 32 in the switching device 101 performs the following processing when the communication ports 34A and 34D respectively transmit the target packet A and an unauthorized intrusion packet addressed to the LiDAR 111D at a timing t5.

That is, the counting unit 32 increments the count value NA and the count value ND. Here, the overall count value is (2, 1, 1, 2).

The detection unit 33 respectively acquires two and one as a maximum value and a minimum value and calculates one as a difference Dif when the overall count value is updated to (2, 1, 1, 2) at the timing t5.

Then, the counting unit 32 increments the count value NB when the communication port 34B transmits the target packet B at a timing t6.

The detection unit 33 respectively acquires two and one as a maximum value and a minimum value and calculates one as a difference Dif when the overall count value is updated to (2, 2, 1, 2) at the timing t6.

Subsequently, the counting unit 32 increments the count value NC when the communication port 34C transmits the target packet C at a timing t7.

The detection unit 33 respectively acquires two and two as a maximum value and a minimum value and calculates zero as a difference Dif when the overall count value is updated to (2, 2, 2, 2) at the timing t7.

Next, the counting unit 32 increments the count value ND when the communication port 34D transmits the target packet D at a timing t8.

The detection unit 33 respectively acquires three and two as a maximum value and a minimum value and calculates one as a difference Dif when the overall count value is updated to (2, 2, 2, 3) at the timing t8.

In the case of the temporal change illustrated in FIG. 6, the difference Dift does not increase before the differences Dif reaches zero with its decreasing, and thus the detection unit 33 determines that unauthorized communication has not occurred.

Figure 7:
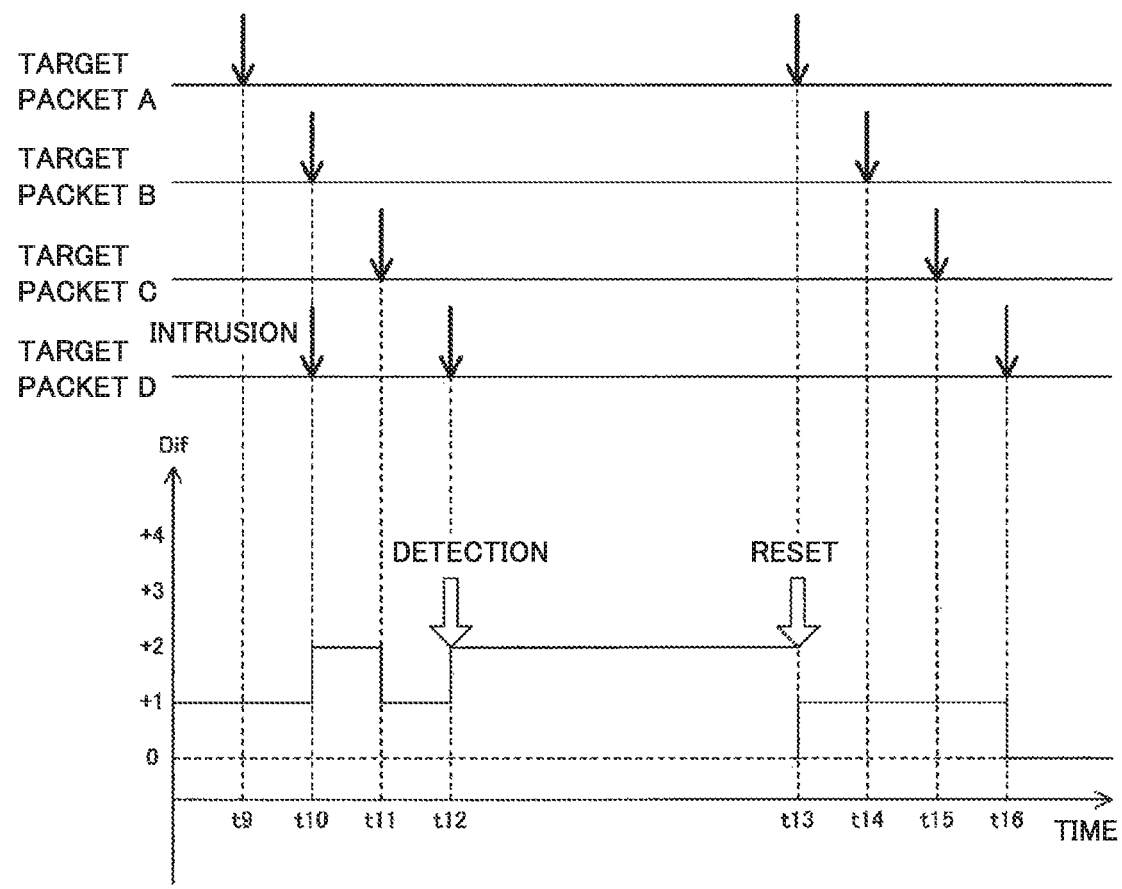
FIG. 7 illustrates one example of the temporal change of the difference if the switching device according to Embodiment 1 of the present disclosure detects an unauthorized intrusion.

FIG. 7 illustrates one example of the temporal change of the difference if the switching device according to Embodiment 1 of the present disclosure detects an unauthorized intrusion.

FIG. 7 illustrates detection of an unauthorized communication transmitted to the LiDAR 111D. Note that the way of viewing FIG. 7 is similar to that of FIG. 3. FIG. 7 further shows a situation of relaying by the switching device 101 at timings after the timing 8 illustrated in FIG. 6.

Referring to FIGS. 1, 2 and 7, the ADAS 111E transmits target packets A, B, C and D in the single packet pattern.

Furthermore, the fake function unit transmits an unauthorized intrusion packet to the LiDAR 111D via the switching device 101.

The counting unit 32 in the switching device 101 increments the count value NA when the communication ports 34A transmits the target packet A at a timing t9. Here, the overall count value is (3, 2, 2, 3).

The detection unit 33 respectively acquires three and two as a maximum value and a minimum value and calculates one as a difference Dif when the overall count value is updated to (3, 2, 2, 3) at the timing t9.

Then, the counting unit 32 performs the following processing when the communication ports 34B and 34D respectively transmit the target packet B and the unauthorized intrusion packet addressed to the LiDAR 111D at a timing t10.

That is, the counting unit 32 increments the count value NB and the count value ND.

The detection unit 33 respectively acquires four and two as a maximum value and a minimum value and calculates two as a difference Dif when the overall count value is updated to (3, 3, 2, 4) at the timing t10.

Subsequently, the counting unit 32 increments the count value NC when the communication port 34C transmits the target packet C at a timing t11.

The detection unit 33 respectively acquires four and three as a maximum value and a minimum value and calculates one as a difference Dif when the overall count value is updated to (3, 3, 3, 4) at the timing t11.

Next, the counting unit 32 increments the count value ND when the communication port 34D transmits the target packet D at a timing t12.

The detection unit 33 respectively acquires five and three as a maximum value and a minimum value and calculates two as a difference Dif when the overall count value is updated to (3, 3, 3, 5) at the timing t12.

The detection unit 33 determines that unauthorized communication has occurred since the difference Dif increases before the differences Dif reaches zero with its decreasing at the timing t12.

Moreover, the detection unit 33 outputs to the counting unit 32 a reset instruction for resetting the count values NA-ND in the counting unit 32.

When receiving the reset instruction from the detection unit 33, the counting unit 32 shifts the state to the reset preparation state according to the received reset instruction.

Here, since the target packet transmitted most recently by the switching device 101 is the target packet D, if its own switching device 101 transmits a target packet different from the target packet D, the counting unit 32 resets the count values NA-ND before incrementing the count value of the corresponding transmission counter.

The ADAS 111E transmits new target packets A, B, C and D at timings after the timing t12 in the single packet pattern.

When the communication port 34A transmits the target packet A at a timing t13, the counting unit 32 performs the following processing since the target packet A different from the target packet D is transmitted in the reset preparation state.

That is, the counting unit 32 resets the overall count value from (3, 3, 3, 5) to (0, 0, 0, 0), and shifts the reset preparation state to the normal state.

Next, the counting unit 32 increments the count value NA. Here, the overall count value is (1, 0, 0, 0).

The detection unit 33 respectively acquires one and zero as a maximum value and a minimum value and calculates one as a difference Dif when the overall count value is updated to (1, 0, 0, 0) at a timing t13.

The counting unit 32 increments the count values NB, NC and ND when the communication ports 34B, 34C and 34D transmit target packets B, C and D at timings t14, t15 and t16, respectively.

The overall count values are (1, 1, 0, 0), (1, 1, 1, 0) and (1, 1, 1, 1) at the timings t14, t15 and t16, respectively.

The detection unit 33 calculates 1, 1 and 0 as differences Dif when the overall count values are updated at the timings t14, t15 and t16, respectively.

The detection unit 33 determines that unauthorized communication has not occurred since the difference Dif does not increase before the differences Dif reaches zero with its decreasing at the timings t13-t16.

Note that in the switching device according to Embodiment 1 of the present disclosure, the counting unit 32 is configured to count the number of packets transmitted by the communication port 34, though not limited thereto. The counting unit 32 may be configured to count the number of packets received by the communication port 34, may be configured to count the number of packets received by the switching unit 31, or may be configured to count the number of packets output by the switching unit 31.

[Modified Pattern of Transmission of Target Packet]

Figure 8:
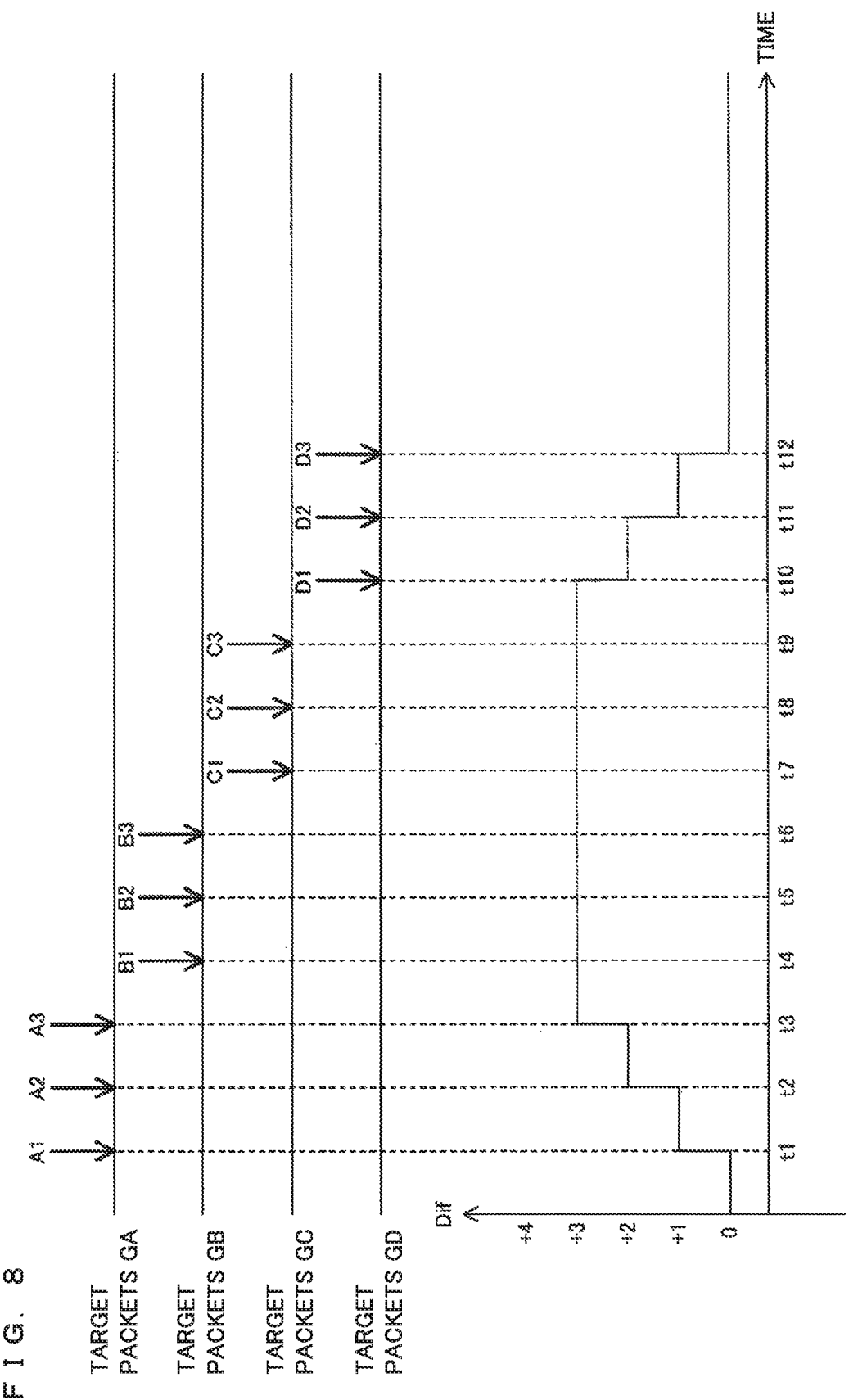
FIG. 8 illustrates one example of the temporal change of a difference if the switching device according to Embodiment 1 of the present disclosure relays each of the normal target packets.

FIG. 8 illustrates one example of the temporal change of a difference if the switching device according to Embodiment 1 of the present disclosure relays each of the normal target packets. Note that the way of viewing FIG. 8 is similar to that of FIG. 3.

Referring to FIGS. 1, 2 and 8, the ADAS 111E respectively transmits target packet groups GA, GB, GC and GD to the LiDARs 111A, 111B, 111C and 111D in this order via the switching device 101.

The target packet group GA includes target packets A1, A2 and A3 serving as target packets A in the order of transmission. The target packet group GB includes target packets B1, B2 and B3 serving as target packets B in the order of transmission. The target packet group GC includes target packets C1, C2 and C3 serving as target packets C in the order of transmission. The target packet group GD includes target packets D1, D2 and D3 serving as target packets D in the order of transmission. Hereafter, the transmission pattern is also referred to as a multi-packet pattern.

The counting unit 32 in the switching device 101 increments the count value NA every time the communication port 34A transmits the target packet A when the communication port 34A transmits the target packets A1, A2 and A3 at timings t1, t2 and t3, respectively.

The overall count values are (1, 0, 0, 0), (2, 0, 0, 0) and (3, 0, 0, 0) at the timings t1, t2 and t3, respectively.

The detection unit 33 calculates one, two and three as differences Dif when the overall count values are updated at the timings t1, t2 and t3, respectively.

Then, the counting unit 32 increments the count value NB every time the communication port 34B transmits the target packet B when the communication port 34B transmits the target packets B1, B2 and B3 at timings t4, t5 and t6, respectively.

The overall count values are (3, 1, 0, 0), (3, 2, 0, 0) and (3, 3, 0, 0) at the timings t4, t5 and t6, respectively.

The detection unit 33 calculates three, three and three as differences Dif when the overall count values are updated at the timings t4, t5 and t6, respectively.

Subsequently, the counting unit 32 increments the count value NC every time the communication port 34C transmits the target packet C when the communication port 34C transmits the target packets C1, C2 and C3 at timings t7, t8 and t9, respectively.

The overall count values are (3, 3, 1, 0), (3, 3, 2, 0) and (3, 3, 3, 0) at the timings t7, t8 and t9, respectively.

The detection unit 33 calculates three, three and three as differences Dif when the overall count values are updated at the timings t7, t8 and t9, respectively.

Then, the counting unit 32 increments the count value ND every time the communication port 34D transmits the target packet D when the communication port 34D transmits the target packets D1, D2 and D3 at timings t10, t11 and t12, respectively.

The overall count values are (3, 3, 3, 1), (3, 3, 3, 2) and (3, 3, 3, 3) at the timing t10, t11 and t12, respectively.

The detection unit 33 calculates two, one and zero as differences Dif when the overall count values are updated at the timings t10, t11 and t12, respectively.

In the case of the temporal change illustrated in FIG. 8, the difference Dift does not increase before the differences Dif reaches zero with its decreasing, and thus the detection unit 33 determines that unauthorized communication has not occurred.

Figure 9:
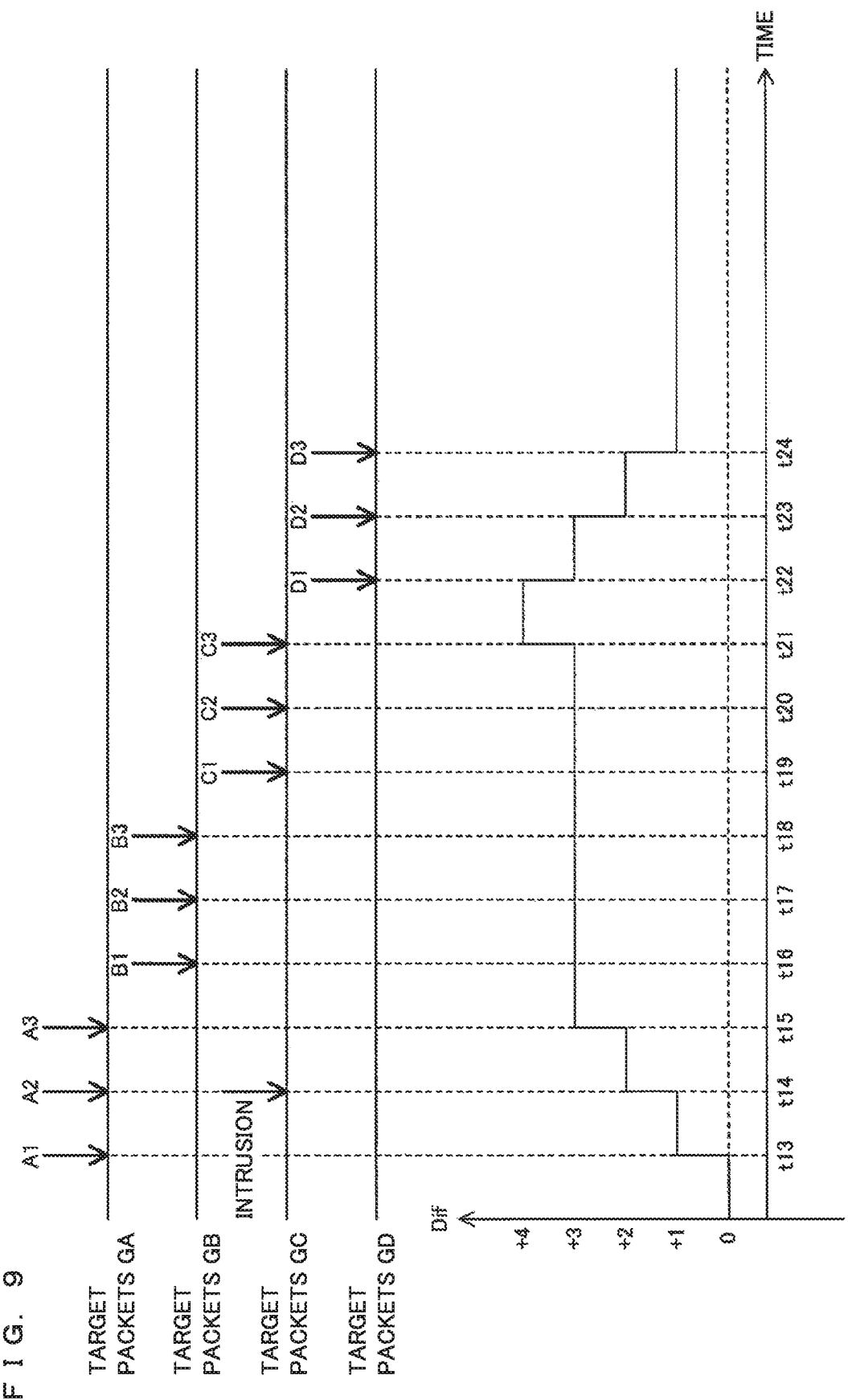
FIG. 9 illustrates one example of the temporal change of the difference if the switching device according to Embodiment 1 of the present disclosure relays each of the normal target packets and an unauthorized intrusion packet.

FIG. 9 illustrates one example of the temporal change of the difference if the switching device according to Embodiment 1 of the present disclosure relays each of the normal target packets and an unauthorized intrusion packet.

It is noted that the way of viewing FIG. 9 is similar to that of FIG. 3. FIG. 9 further illustrates a situation of relaying by the switching device 101 at timings after the timing t12 illustrated in FIG. 8.

Referring to FIGS. 1, 2 and 9, the ADAS 111E transmits target packet groups GA, GB, GC and GD in the multi-packet pattern.

Moreover, the fake function unit transmits an unauthorized intrusion packet to the LiDAR 111C via the switching device 101.

The counting unit 32 in the switching device 101 increments the count value NA when the communication port 34A transmits the target packet A1 at a timing t13. Here, the overall count value is (4, 3, 3, 3).

The detection unit 33 respectively acquires four and three as a maximum value and a minimum value and calculates one as a difference Dif when the overall count value is updated to (4, 3, 3, 3) at the timing t13.

Next, the counting unit 32 performs the following processing when the communication ports 34A and 34C respectively transmit the target packet A2 and the unauthorized intrusion packet addressed to the LiDAR 111C at a timing t14.

That is, the counting unit 32 increments the count value NA and the count value NC. Here, the overall count value is (5, 3, 4, 3).

The detection unit 33 respectively acquires five and three as a maximum value and a minimum value and calculates two as a difference Dif when the overall count value is updated to (5, 3, 4, 3) at the timing t14.

Then, the counting unit 32 increments the count value NA when the communication port 34A transmits the target packet A3 at a timing t15.

The detection unit 33 acquires six and three as a maximum value and a minimum value and calculates three as a difference Dif when the overall count value is updated to (6, 3, 4, 3) at the timing t15.

Next, the counting unit 32 increments the count value NB every time the communication port 34B transmits the target packet B when the communication port 34B transmits the target packets B1, B2 and B3 at timings t16, t17 and t18, respectively.

The overall count values are (6, 4, 4, 3), (6, 5, 4, 3) and (6, 6, 4, 3) at the timings t16, t17 and t18, respectively.

The detection unit 33 calculates three, three and three as differences Dif when the overall count values are updated at the timings t16, t17 and t18, respectively.

Subsequently, the counting unit 32 increments the count value NC every time the communication port 34C transmits the target packet C when the communication port 34C transmits the target packets C1, C2 and C3 at timings t19, t20 and t21, respectively.

The overall count values are (6, 6, 5, 3), (6, 6, 6, 3) and (6, 6, 7, 3) at the timings t19, t20 and t21, respectively.

The detection unit 33 calculates three, three and four as differences Dif when the overall count values are updated at the timings t19, t20 and t21, respectively.

Next, the counting unit 32 increments the count value ND every time the communication port 34D transmits the target packet D when the communication port 34D transmits the target packets D1, D2 and D3 at timings t22, t23 and t24, respectively.

The overall count values are (6, 6, 7, 4), (6, 6, 7, 5) and (6, 6, 7, 6) at the timings t22, t23 and t24, respectively.

The detection unit 33 calculates three, two and one as differences Dif when the overall count values are updated at the timings t22, t23 and t24, respectively.

In the case of the temporal change illustrated in FIG. 9, the difference Dift does not increase before the differences Dif reaches zero with its decreasing, and thus the detection unit 33 determines that unauthorized communication has not occurred.

Figure 10:
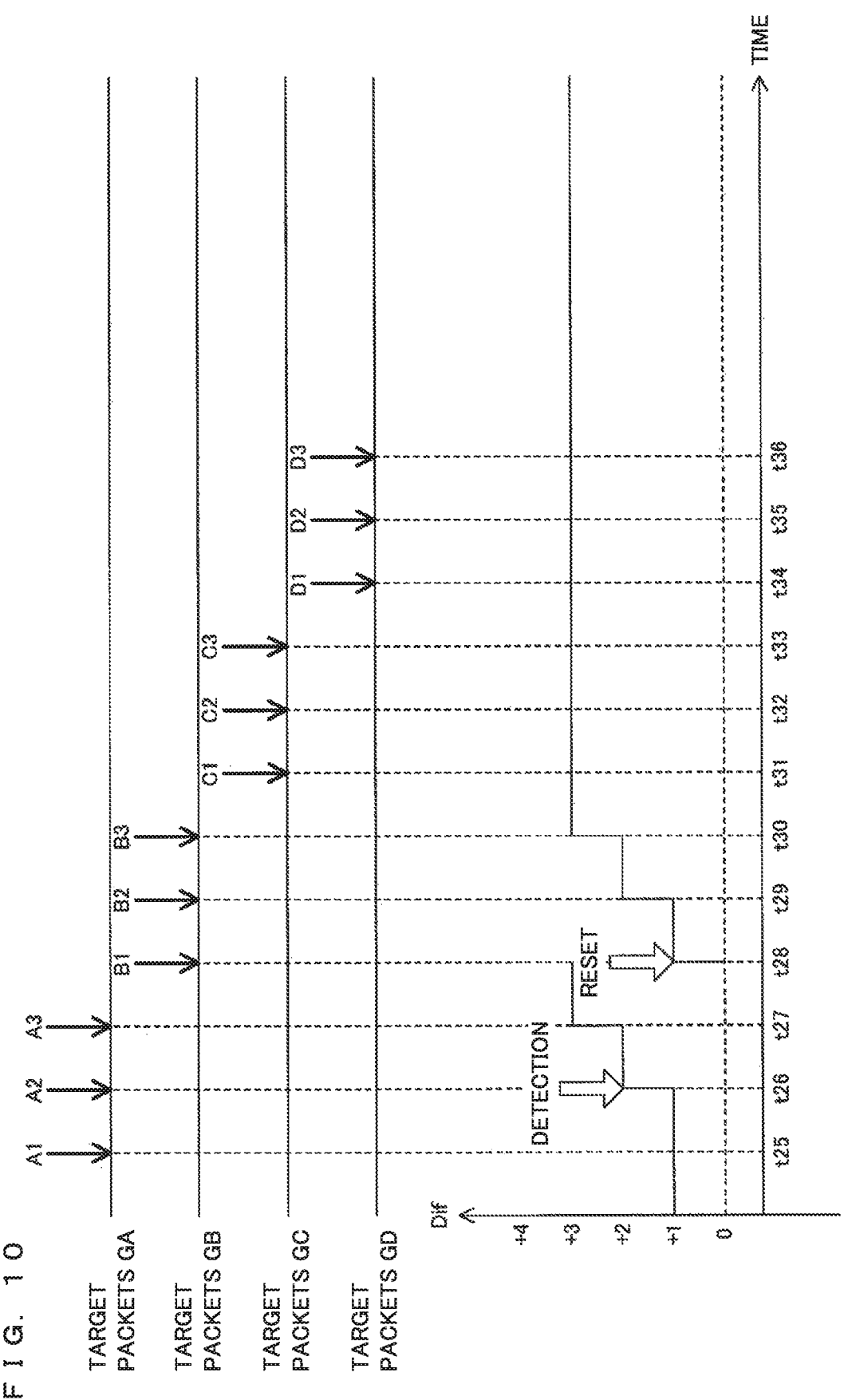
FIG. 10 illustrates one example of the temporal change of the difference if the switching device according to Embodiment 1 of the present disclosure detects an unauthorized intrusion.

FIG. 10 illustrates one example of the temporal change of the difference if the switching device according to Embodiment 1 of the present disclosure relays an unauthorized intrusion.

Note that the way of viewing FIG. 10 is similar to that of FIG. 3. FIG. 10 further shows a situation of relaying by the switching device 101 at timings after the timing t24 illustrated in FIG. 9.

FIG. 10 illustrates unauthorized communication with the LiDAR 111C (see FIG. 9). This applies to unauthorized communication with the LiDARs 111A and 111B. Unauthorized communication with the LiDAR 111D will be described later.

Referring to FIGS. 1, 2 and 10, the ADAS 111E transmits target packet groups GA, GB, GC and GD in the multi-packet pattern.

When the counting unit 32 in the switching device 101 increments the count value NA when the communication port 34A transmits the target packet A1 at a timing t25. Here, the overall count value is (7, 6, 7, 6).

The detection unit 33 respectively acquires seven and six as a maximum value and a minimum value and calculates one as a difference Dif when the overall count value is updated to (7, 6, 7, 6) at the timing t25.

Next, the counting unit 32 increments the count value NA when the communication port 34A transmits the target packet A2 at a timing t26.

The detection unit 33 respectively acquires eight and six as a maximum value and a minimum value and calculates two as a difference Dif when the overall count value is updated to (8, 6, 7, 6) at the timing t26.

The detection unit 33 determines that unauthorized communication has occurred since the difference Dif increases before the differences Dif reaches zero with its decreasing at the timing t26 and performs detection result processing.

Moreover, the detection unit 33 outputs to the counting unit 32 a reset instruction for resetting the count values NA-ND in the counting unit 32.

When receiving the reset instruction from the detection unit 33, the counting unit 32 shifts the state to the reset preparation state according to the received reset instruction.

Here, since the target packet transmitted most recently by the switching device 101 is the target packet A2, if its own switching device 101 transmits a target packet different from either of the target packets A1-A3, the counting unit 32 resets the count values NA-ND before incrementing the count value of the corresponding transmission counter.

Next, the counting unit 32 increments the count value NA without resetting the count values NA-ND when the communication port 34A transmits the target packet A3 at a timing t27.

The detection unit 33 respectively acquires nine and six as a maximum value and a minimum value and calculates three as a difference Dif when the overall count value is updated to (9, 6, 7, 6) at the timing t27.

Subsequently, when the communication port 34B transmits the target packet B1 at a timing t28, the counting unit 32 performs the following processing since its own switching device 101 transmits the target packets B1 different from either of the target packets A1-A3 in the reset preparation state.

That is, the counting unit 32 resets the overall count value from (9, 6, 7, 6) to (0, 0, 0, 0) and shifts the state from the reset preparation state to the normal state.

Then, the counting unit 32 increments the count value NB.

Here, the overall count value is (0, 1, 0, 0).

The detection unit 33 acquires one and zero as a maximum value and a minimum value and calculates one as a difference Dif when the overall count value is updated to (0, 1, 0, 0) at the timing t28.

Then, the counting unit 32 increments the count value NB every time the communication port 34B transmits the target packet B when the communication port 34B transmits the target packets B2 and B3 at timings t29 and t30, respectively.

The overall count values are respectively (0, 2, 0, 0) and (0, 3, 0, 0) at the timings t29 and t30.

The detection unit 33 acquires two and three as differences Dif when the overall count values are updated at the timings t29 and t30, respectively.

Next, the counting unit 32 increments the count value NC every time the communication port 34C transmits the target packet C when the communication port 34C transmits the target packets C1, C2 and C3 at timings t31, t32 and t33, respectively.

The overall count values are (0, 3, 1, 0), (0, 3, 2, 0) and (0, 3, 3, 0) at the timing t31, t32 and t33, respectively.

The detection unit 33 calculates three, three and three as differences Dif when the overall count values are updated at the timing t31, t32 and t33, respectively.

Next, the counting unit 32 increments the count value ND every time the communication port 34D transmits the target packet D when the communication port 34D transmits the target packets D1, D2 and D3 at timings t34, t35 and t36, respectively.

The overall count values are (0, 3, 3, 1), (0, 3, 3, 2) and (0, 3, 3, 3) at the timings t34, t35 and t36, respectively.

The detection unit 33 calculates three, three and three as differences Dif when the overall count values are updated at the timings t34, t35 and t36, respectively.

[Detection of Unauthorized Communication with LiDAR 111D in Multi-Packet Pattern]

Figure 11:
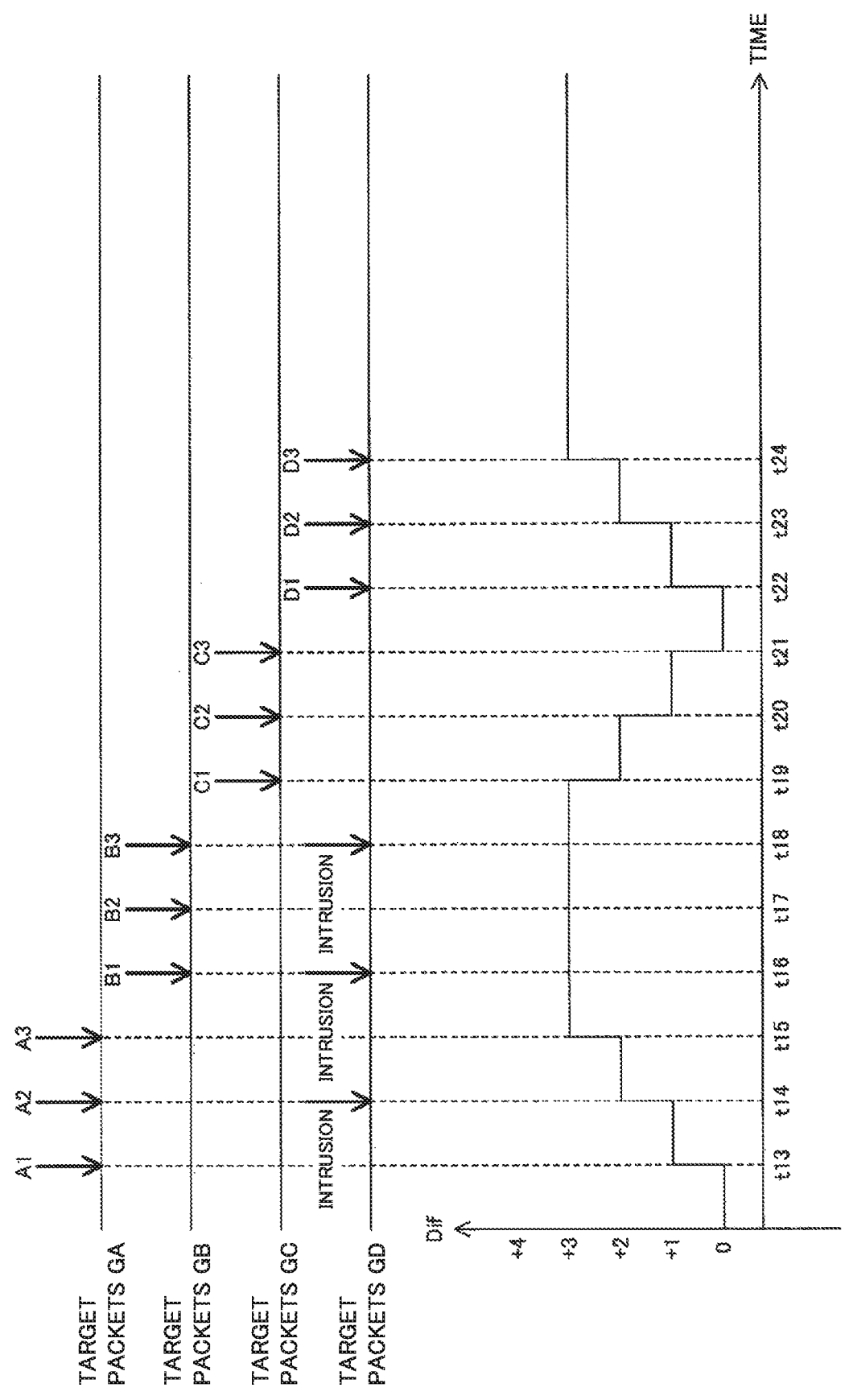
FIG. 11 illustrates one example of the temporal change of a difference if the switching device according to Embodiment 1 of the present disclosure relays each of the normal target packets and unauthorized intrusion packets.

FIG. 11 illustrates one example of the temporal change of a difference if the switching device according to Embodiment 1 of the present disclosure relays each of the normal target packets and unauthorized intrusion packets.

Note that the way of viewing FIG. 11 is similar to that of FIG. 3. FIG. 11 further shows a situation of relaying by the switching device 101 at timings after the timing t12 illustrated in FIG. 8.

Referring to FIGS. 1, 2 and 11, the ADAS 111E transmits target packet groups GA, GB, GC and GD in the multi-packet pattern.

Moreover, the fake function unit transmits three unauthorized intrusion packets to the LiDAR 111D via the switching device 101.

The counting unit 32 in the switching device 101 increments the count value NA when the communication port 34A transmits the target packet A1 at a timing t13. Here, the overall count value is (4, 3, 3, 3).

The detection unit 33 respectively acquires four and three as a maximum value and a minimum value and calculates one as a difference Dif when the overall count value is updated to (4, 3, 3, 3) at the timing t13.

Next, the counting unit 32 performs the following processing when the communication ports 34A and 34D respectively transmit the target packet A2 and the unauthorized intrusion packet addressed to the LiDAR 111D at a timing t14.

That is, the counting unit 32 increments the count value NA and the count value ND. Here, the overall count value is (5, 3, 3, 4).

The detection unit 33 respectively acquires five and three as a maximum value and a minimum value and calculates two as a difference Dif when the overall count value is updated to (5, 3, 3, 4) at the timing t14.

Subsequently, the counting unit 32 increments the count value NA when the communication port 34A transmits the target packet A3 at a timing t15.

The detection unit 33 respectively acquires six and three as a maximum value and a minimum value and calculates three as a difference Dif when the overall count value is updated to (6, 3, 3, 4) at the timing t15.

Then, the counting unit 32 performs the following processing when the communication ports 34B and 34D respectively transmit the target packet B1 and the unauthorized intrusion packet addressed to the LiDAR 111D at a timing t16.

That is, the counting unit 32 increments the count value NB and the count value ND. Here, the overall count value is (6, 4, 3, 5).

The detection unit 33 respectively acquires six and three as a maximum value and a minimum value and calculates three as a difference Dif when the overall count value is updated to (6, 4, 3, 5) at the timing t16.

Next, the counting unit 32 increments the count value NB when the communication port 34B transmits the target packet B2 at a timing t17.

The detection unit 33 respectively acquires six and three as a maximum value and a minimum value and calculates three as a difference Dif when the overall count value is updated to (6, 5, 3, 5) at the timing t17.

Then, the counting unit 32 performs the following processing when the communication ports 34B and 34D respectively transmit the target packet B3 and the unauthorized intrusion packet addressed to the LiDAR 111D at a timing t18.

That is, the counting unit 32 increments the count value NB and the count value ND. Here, the overall count value is (6, 6, 3, 6).

The detection unit 33 respectively acquires six and three as a maximum value and a minimum value and calculates three as a difference Dif when the overall count value is updated to (6, 6, 3, 6) at the timing t18.

Next, the counting unit 32 increments the count value NC every time the communication port 34C transmits the target packet C when the communication port 34C transmits the target packets C1, C2 and C3 at timings t19, t20 and t21, respectively.

The overall count values are (6, 6, 4, 6), (6, 6, 5, 6) and (6, 6, 6, 6) at the timings t19, t20, and t21, respectively.

The detection unit 33 calculates two, one and zero as differences Dif when the overall count values are updated at the timings t19, t20 and t21, respectively.

Subsequently, the counting unit 32 increments the count value ND every time the communication port 34D transmits the target packet D when the communication port 34D transmits the target packets D1, D2 and D3 at timings t22, t23 and t24, respectively.

The overall count values are (6, 6, 6, 7), (6, 6, 6, 8) and (6, 6, 6, 9) at the timings t22, t23 and t24, respectively.

The detection unit 33 calculates one, two and three as differences Dif when the overall count values are updated at the timings t22, t23 and t24, respectively.

Figure 12:
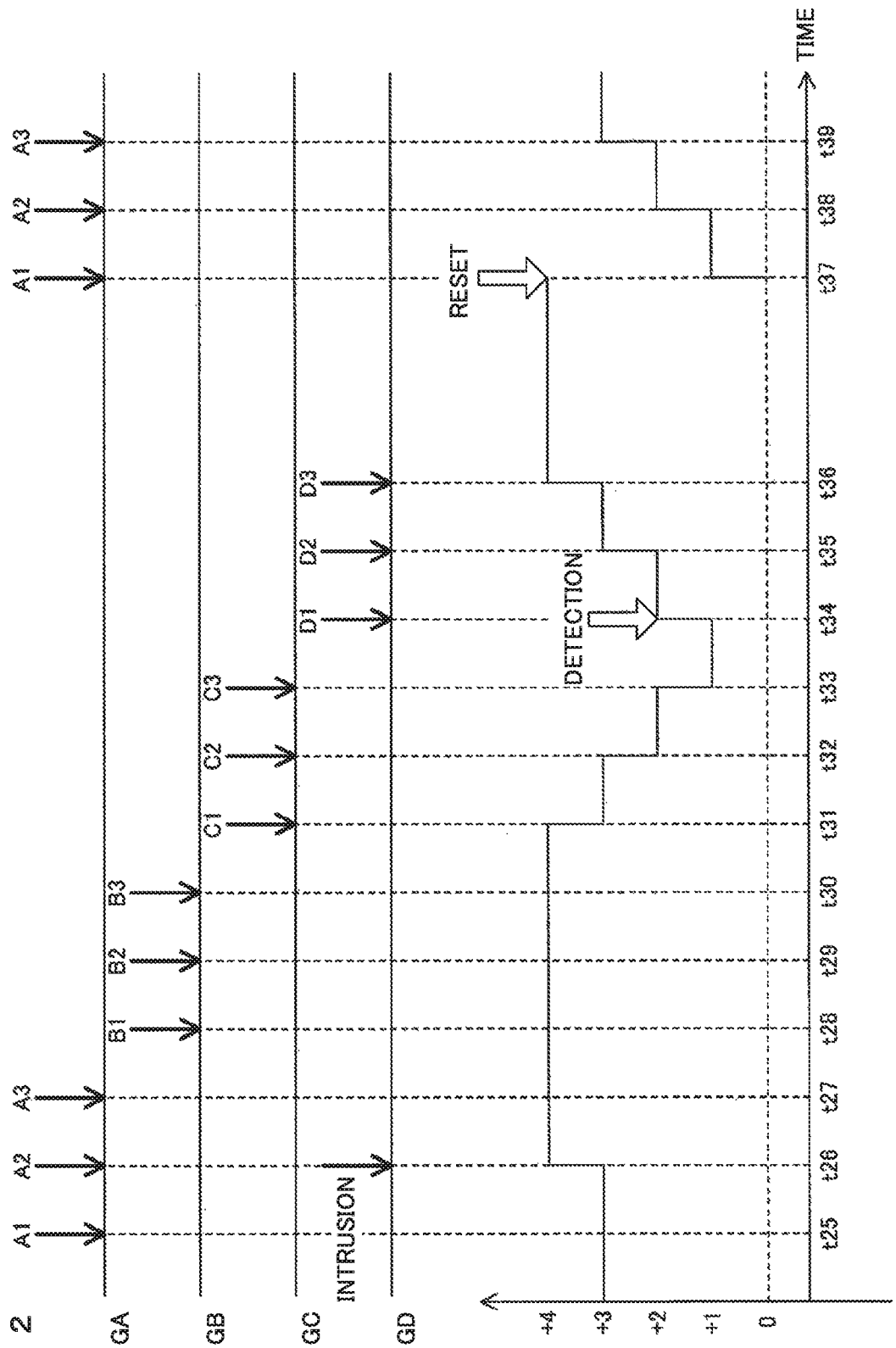
FIG. 12 illustrates one example of the temporal change of the difference if the switching device according to Embodiment 1 of the present disclosure detects an unauthorized intrusion.

FIG. 12 illustrates one example of the temporal change of the difference if the switching device according to Embodiment 1 of the present disclosure detects an unauthorized intrusion.

FIG. 12 illustrates detection of an unauthorized communication to the LiDAR 111D. Note that the way of viewing FIG. 12 is similar to that of FIG. 3. FIG. 12 further shows a situation of relaying by the switching device 101 at timings after the timing 24 illustrated in FIG. 11.

Referring to FIGS. 1, 2 and 12, the ADAS 111E transmits the target packet groups GA, GB, GC and GD in the multi-packet pattern.

Moreover, the fake function unit transmits one unauthorized intrusion packet to the LiDAR 111D via the switching device 101.

The counting unit 32 in the switching device 101 increments the count value NA when the communication port 34A transmits the target packet A1 at a timing t25. Here, the overall count value is (7, 6, 6, 9).

The detection unit 33 respectively acquires nine and six as a maximum value and a minimum value and calculates three as a difference Dif when the overall count value is updated to (7, 6, 6, 9) at the timing t25.

Then, the counting unit 32 performs the following processing when the communication ports 34A and 34D respectively transmit the target packet A2 and the unauthorized intrusion packet addressed to the LiDAR 111D at a timing t26.

That is, the counting unit 32 increments the count value NA and the count value ND. Here, the overall count value is (8, 6, 6, 10).

The detection unit 33 respectively acquires ten and six as a maximum value and a minimum value and calculates four as a difference Dif when the overall count value is updated to (8, 6, 6, 10) at the timing t26.

Next, the counting unit 32 increments the count value NA when the communication port 34A transmits the target packet A3 at a timing t27.

The detection unit 33 respectively acquires ten and six as a maximum value and a minimum value and calculates four as a difference Dif when the overall count value is updated to (9, 6, 6, 10) at the timing t27.

Then, the counting unit 32 increments the count value NB every time the communication port 34B transmits the target packet B when the communication port 34B transmits the target packets B1, B2 and B3 at timings t28, t29 and t30, respectively.

The overall count values are (9, 7, 6, 10), (9, 8, 6, 10) and (9, 9, 6, 10) at the timings t28, t29 and t30, respectively.

The detection unit 33 calculates four, four and four as differences Dif when the overall count value are updated at the timings t28, t29 and t30, respectively.

Next, the counting unit 32 increments the count value NC every time the communication port 34C transmits the target packet C when the communication port 34C transmits the target packets C1, C2 and C3 at timings t31, t32 and t33, respectively.

The overall count values are respectively (9, 9, 7, 10), (9, 9, 8, 10) and (9, 9, 9, 10) at the timings t31, t32 and t33.

The detection unit 33 calculates three, two and one as differences Dif when the overall count values are updated at the timings t31, t32 and t33, respectively.

Subsequently, the counting unit 32 increments the count value ND when the communication port 34D transmits the target packet D1 at a timing t34.

The detection unit 33 respectively acquires eleven and nine as a maximum value and a minimum value and calculates two as a difference Dif when the overall count value is updated to (9, 9, 9, 11) at the timing t34.

The detection unit 33 determines that unauthorized communication has occurred since the difference Dif increases before the differences Dif reaches zero with its decreasing at the timing t34, and performs detection result processing.

Moreover, the detection unit 33 outputs to the counting unit 32 a reset instruction for resetting the count values NA-ND in the counting unit 32.

When receiving the reset instruction from the detection unit 33, the counting unit 32 shifts the state to the reset preparation state according to the received reset instruction.

Here, since the target packet transmitted most recently by the switching device 101 is the target packet D1, if its own switching device 101 transmits a target packet different from either of the target packets D1-D3, the counting unit 32 resets the count values NA-ND before incrementing the count value of the corresponding transmission counter.

Then, the counting unit 32 increments the count value ND without resetting the count values NA-ND when the communication port 34D transmits the target packet D2 at a timing t35.

The detection unit 33 respectively acquires twelve and nine as a maximum value and a minimum value and calculates three as a difference Dif when the overall count value is updated to (9, 9, 9, 12) at the timing t35.

Next, the counting unit 32 increments the count value ND without resetting the count values NA-ND when the communication port 34D transmits the target packet D3 at a timing t36.

The detection unit 33 respectively acquires thirteen and nine as a maximum value and a minimum value and calculates four as a difference Dif when the overall count value is updated to (9, 9, 9, 13) at the timing t36.

The ADAS 111E transmits new target packet groups GA, GB, GC and GD at timings after the timing t36 in the multi-packet pattern.

Subsequently, when the communication port 34A transmits the target packet A1 at a timing S37, the counting unit 32 performs the following processing since its own switching device 101 transmits the target packets A1 different from either of the target packets D1-D3 in the reset preparation state.

That is, the counting unit 32 resets the overall count value from (9, 9, 9, 13) to (0, 0, 0, 0) and shifts the state from the reset preparation state to the normal state.

Then, the counting unit 32 increments the count value NA. Here, the overall count value is (1, 0, 0, 0).

The detection unit 33 respectively acquires one and zero as a maximum value and a minimum value and calculates one as a difference Dif when the overall count value is updated to (1, 0, 0, 0) at the timing t37.

Next, the counting unit 32 increments the count value NA when the communication port 34A transmits the target packet A2 at a timing t38.

The detection unit 33 respectively acquires two and zero as a maximum value and a minimum value and calculates two as a difference Dif when the overall count value is updated to (2, 0, 0, 0) at the timing t38.

Then, the counting unit 32 increments the count value NA when the communication port 34A transmits the target packet A3 at a timing t39.

The detection unit 33 respectively acquires three and zero as a maximum value and a minimum value and calculates three as a difference Dif when the overall count value is updated to (3, 0, 0, 0) at the timing t39.

From this point onward, the operation performed when the switching device 101 relays the target packet groups GB-GD is similar to the operation performed at the timings t4-t12 illustrated in FIG. 8.

[Flow of Operation]

Each of the devices in the on-vehicle communication system 301 includes a computer, and a computation processing unit such as a CPU in the computer reads out programs including a part or all of the steps in a sequence diagram or a flowchart as described below from a memory not illustrated and executes the same. These programs of the multiple devices may be installed from the external device. These programs of the multiple devices may be distributed while being stored in a recording medium.

Figure 13:
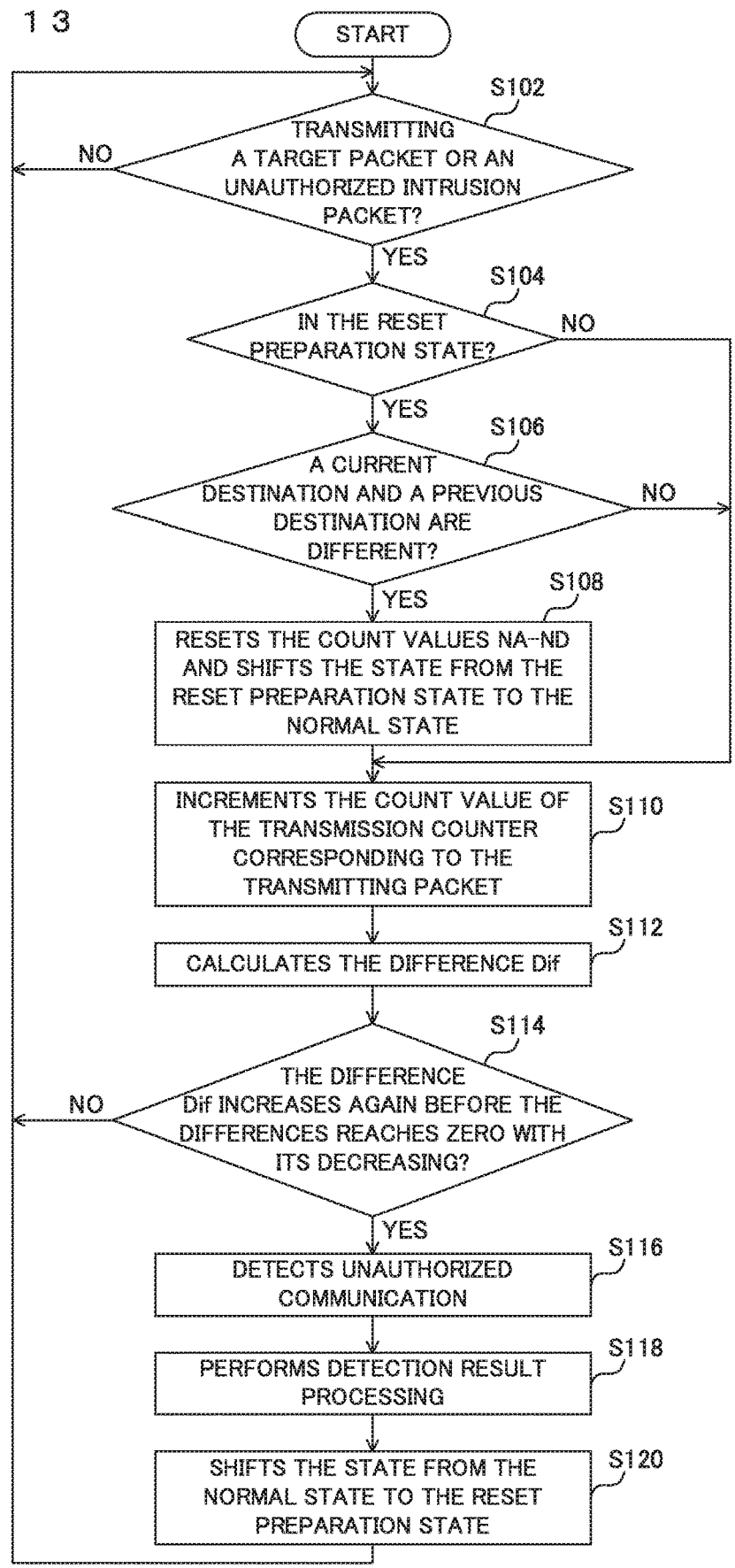
FIG. 13 illustrates a flowchart defining a processing procedure when the switching device in the on-vehicle communication system according to Embodiment 1 of the present disclosure unauthorized communication.

FIG. 13 is a flowchart defining the processing procedure performed when the switching device in the on-vehicle communication system according to Embodiment 1 of the present disclosure detects unauthorized communication.

Referring to FIG. 13, the switching device 101 is assumed to be in the normal state. First, the switching device 101 suspends detection processing while transmitting a target packet or an unauthorized intrusion packet to the LiDAR 111 (NO at step S102).

When transmitting a target packet or an unauthorized intrusion packet to the LiDAR 111 (YES at step S102), the switching device 101, if it is in the reset preparation state, and the LiDAR 111 as a current destination and the LiDAR 111 as a previous destination are different (YES at step S104 and YES at step S106), resets the count values NA-ND and shifts the state from the reset preparation state to the normal state (step S108).

Then, the switching device 101 increments the count value of the transmission counter corresponding to the transmitting packet (step S110).

Then, the switching device 101 calculates the difference Dif between the maximum value and the minimum value of the count values NA-ND (step S112).

Next, the switching device 101 detects unauthorized communication (step S116) if the difference Dif increases again before the differences Dif reaches zero with its decreasing in the temporal change of the difference Dif (YES at step S114).

Subsequently, the switching device 101 performs detection result processing (step S118).

Then, the switching device 101 shifts the state from the normal state to the reset preparation state (step S120).

Next, the switching device 101 suspends the detection processing until it transmits a new target packet or an unauthorized intrusion packet to the LiDAR 111 (NO at step S102) if the difference Dif does not increase again before the differences Dif reaches zero with its decreasing in the temporal change of the difference Dif (NO at step S114), or if it shifts the state to the reset preparation state (step S120).

Note that the order of the above-mentioned steps S116 and S118 and the above-mentioned step S120 is not limited to the above description and may be interchanged.

Moreover, in the vehicle 1, a diagnosis mode for performing fault diagnosis and a maintenance mode for performing maintenance may be operated. In such modes, target packets may not be transmitted to the function units uniformly. Thus, in the diagnosis mode and the maintenance mode, the above-described flow of the operation may be invalidated.

Additionally, in the on-vehicle communication system according to Embodiment 1 of the present disclosure, the LiDARs 111 are configured to operate as target function units, though the target function units are not limited thereto. Multiple cameras, millimeter wave sensors, etc. provided in the vehicle 1 may be configured to operate as target function units.

In addition, in the on-vehicle communication system according to Embodiment 1 of the present disclosure, the target packets A, B, C and D are respectively transmitted to the LiDARs 111A, 111B, 111C and 111D from the ADAS 111E in this order as a predetermined order, though the order is not limited thereto. The target packets may be transmitted to the respective target function units in order. Specifically, the order of transmitting the target packets A, B, C and D may be different from each acquisition period. More specifically, the target packets A, B, C and D may be transmitted in the order of target packets A, B, C, D, B, C, A, D, D, A, C, B and so on during three consecutive acquisition periods, for example. In this case as well, the detection unit 33 can detect unauthorized communication with target function units other than the last target function unit in the above-mentioned order.

Furthermore, in the on-vehicle communication system according to Embodiment 1 of the present disclosure, the LiDARs 111A, 111B, 111C and 111D as examples of the target function units each are configured to transmit a UDP packet including the measurement result to the ADAS 111E being one example of a common function unit 111, though the target function unit is not limited to this configuration. The target function units may be configured not to transmit packets to the common function unit 111. More specifically, each of the target function units may be function units 111 only periodically receiving time setting information, a setting change instruction and so on that are transmitted from the common function unit, for example.

Moreover, in the on-vehicle communication system according to Embodiment 1 of the present disclosure, the LiDARs 111A, 111B, 111C and 111D as examples of the target function units are configured to include laser devices and light receiving elements as examples of the devices of the same type, though not limited thereto. The target function units may be configured not to include devices of the same type.

Additionally, in the on-vehicle communication system according to Embodiment 1 of the present disclosure, the function units are function units 111 satisfying the condition that the destination port numbers in the target packets are the same, though not limited thereto. The target function units may be the function units 111 satisfying the conditions that their addresses are included in a predetermined range. More specifically, the IP addresses of the LiDARs 111A, 111B, 111C and 111D are respectively 192.168.1.10, 192.168.1.11, 192.168.1.12 and 192.168.1.13, and the predetermined range is 192.168.1.10-192.168.1.13.

In addition, the target function units may be function units 111 satisfying a condition that the target function units have the same identifier of a network to which they belong. More specifically, the function units may be all the function units 111 belonging to VLAN1, for example.

Furthermore, the target function units may be function units 111 satisfying a condition that they are defined by predetermined definition information. Specifically, in the configuration file stored in the storage unit 35, for example, identification information such as the IP address, the MAC address, the serial number and so on of the target function units is registered as definition information, and the counting unit 32 counts each of the numbers of target packets based on the definition information registered in the configuration file.

Moreover, the function units may be the function units satisfying another condition, though not limited to the function units satisfying at least one of the conditions that the destination port numbers in the target packets are the same, their addresses are included in a predetermined range, their identifier of a network to which they belong are the same, and the target function units are defined by the predetermined definition information.

Additionally, in the switching device according to Embodiment 1 of the present disclosure, the detection unit 33 is configured to detect unauthorized communication with a target function unit based on the temporal change of the difference Dif, though not limited to such a configuration. For example, the detection unit 33 may be configured to detect unauthorized communication with a target function unit based on which one is larger, between the length of the period during which the maximum value and the minimum value of the numbers of relayed packets counted by the counting unit 32 are not equal to each other and a predetermined threshold.

In addition, in the switching device according to Embodiment 1 of the present disclosure, the detection unit 33 is configured to detect unauthorized communication based on a value obtained when the difference Dif decreases and then increases in the temporal change of the difference Dif, though not limited to such a configuration. The detection unit 33 may be configured to detect unauthorized communication based on the value obtained when the difference Dif increases and then decreases.

Furthermore, in the switching device according to Embodiment 1 of the present disclosure, the detection unit 33 is configured to determine that unauthorized communication has occurred if the difference Dif increases before the differences Dif reaches zero with its decreasing in the temporal change of the difference Dif, though not limited to such a configuration. The detection unit 33 may be configured to determine that unauthorized communication has occurred if the difference Dif increases before it decreases and reaches a value larger than one (if the difference Dif reaches a value larger than one with its decreasing).

Moreover, in the switching device according to Embodiment 1 of the present disclosure, the counting unit 32 is configured to reset the numbers of relayed packets if unauthorized communication is detected by the detection unit 33, though not limited to such a configuration. The counting unit 32 may be configured to periodically reset the numbers of relayed packets, for example. This makes it possible to prevent erroneous detection of unauthorized communication when an unauthorized intrusion packet is not relayed from continuing.

Additionally, in the switching device according to Embodiment 1 of the present disclosure, in the case where the target packets are transmitted to the respective target function units in a predetermined order, the counting unit 32 is configured to reset the numbers of relayed packets when the target function unit to which a target packet is to be relayed is switched after unauthorized communication is detected by the detection unit 33, though not limited to such a configuration. The counting unit 32 may be configured to reset the numbers of relayed packets when transmission of the target packet to the last target function unit is completed after unauthorized communication is detected by the detection unit 33, for example.

Meanwhile, in the in-vehicle communication system according to Patent Document 1, communication between the in-vehicle LAN and an external apparatus through a gateway is inhibited in a parking state of the vehicle, so that unauthorized access to the in-vehicle LAN from the external apparatus through the gateway can be prevented. In the running state of the vehicle, however, unauthorized access from the external apparatus cannot be prevented.

In the detection method described in Non-Patent Document 1, using a TCP connection and a time-out, an attack is detected. It is, however, difficult to detect a Slow Read DoS attack without using the TCP connection with the use of the above-described method.

To address these problems, the switching device according to Embodiment 1 of the present disclosure performs relay processing of relaying data between a plurality of function units 111 mounted on a vehicle 1. The counting unit 32 counts each of the numbers of relayed packets that are the numbers of packets relayed to respective target function units being the plurality of function units 111 of a same type in the relay processing. The detection unit 33 monitors a count value of the numbers counted by the counting unit 32 and detects unauthorized communication with the target function units based on a maximum value and a minimum value of the numbers of relayed packets counted by the counting unit 32.

The target function units are of the same type, and it is conceivable that packets relayed to the respective target function units are the same in number. The numbers of relayed packets transmitted to the respective target function units are counted, and unauthorized communication with the target function units is detected based on the maximum value and the minimum value of the counted numbers of relayed packets. By such a configuration, unauthorized communication, such as a Slow Read DoS attack, that is difficult to be detected in the function unit 111 located at the end in the on-vehicle network can be detected based on variation in number of relayed packets that are to be the same. Furthermore, the numbers of relayed packets are counted, and by such a configuration, unauthorized communication can be detected regardless of a communication protocol. More specifically, even if the packets to be relayed are a UDP packet not using a TCP connection, a Slow Read DoS attack can be detected. In addition, the switching device 101 is operated irrespective of a running state of the vehicle 1, and by such a configuration, unauthorized communication can be detected in the state where the vehicle 1 is running as well in addition to the state where the vehicle 1 is parked. Accordingly, good security can be provided in the on-vehicle network.

Furthermore, in the switching device according to Embodiment 1 of the present disclosure, the packets are transmitted to the target function units in order. The detection unit 33 is able to detect unauthorized communication with the target function units other than the last one of the target function units in the order.

In the case where the packets are transmitted to the respective target function units in order, a timing when the maximum value and the minimum value take the same value may occur in the absence of an unauthorized intrusion packet. In contrast, in the presence of one or more unauthorized intrusion packets transmitted to the target function units other than the last target function unit in the order, a timing when the maximum value and the minimum value take the same value does not occur. By the above-described configuration focusing on such a difference, one or more unauthorized intrusion packets transmitted to the target function units other than the last target function unit in the order can be detected.

Moreover, in the switching device according to Embodiment 1 of the present disclosure, the detection unit 33 is able to detect the unauthorized communication if two or more packets are relayed to any one of the target function units in unauthorized communication.

If the number of unauthorized intrusion packets is small, a timing when the maximum value and the minimum value take the same value may occur even in the presence of an unauthorized intrusion packet. If, however, the number of unauthorized intrusion packets becomes larger, a timing when the maximum value and the minimum value take the same value does not occur. By the above-described configuration focusing on such a difference, an unauthorized intrusion packet transmitted to the target function units can be detected.

Additionally, in the switching device according to Embodiment 1 of the present disclosure, the target function units are function units that transmit packets to a common function unit 111.

By such a configuration, in the case where the respective target function units transmit packets to the common function unit 111 in response to a request from the common function unit 111, the packets including this request are uniformly transmitted to the respective target function units. Thus, such packets including the request can be used as packets of the same number of relays to the respective target function units.

In addition, in the switching device according to Embodiment 1 of the present disclosure, the target function units are function units satisfying at least any one of conditions that destination port numbers for the packets are same, that addresses are included in a predetermined range, that identifiers of a network to which the target function units belong are same and the target function units are defined by predetermined definition information.

Since the applications of the destination to which the above-described packets are to be transmitted are highly likely to be the same, it is considered that the above-described packets are equally transmitted to the target function units. Furthermore, since the addresses of the target function units are highly likely to be the same, it is considered that the above-described packets are equally transmitted to the target function units. Moreover, since the target function units belong to the same network, it is considered that the above-described packets are equally transmitted to the target function units. Additionally, if the target function units to which the above-described packets are to be equally transmitted are included in the definition information, for example, it is considered that the above-described packets are equally transmitted to the target function units. Thus, such packets can be used as packets of the same number of relays to the respective target function units.

Furthermore, in the switching device according to Embodiment 1 of the present disclosure, the target function units include devices of the same type.

Since devices included in the target function units are highly likely to perform the same operation, it is considered that packets each including instructions to the respective devices are uniformly transmitted to the target function units. Thus, such packets can be used as packets of the same number of relays to the respective target function units.

Moreover, in the switching device according to Embodiment 1 of the present disclosure, the detection unit 33 detects the unauthorized communication based on a change in a difference between the maximum value and the minimum value.

In the absence of an unauthorized intrusion packet, the difference decreases and reaches zero and then increases as the time passes. In contrast, in the presence of an unauthorized intrusion packet, the difference decreases and reaches a value larger than zero and then increases as the time passes. By focusing on such a temporal change of the difference, an intrusion of an unauthorized packet to the on-vehicle network can be detected.

Additionally, in the switching device according to Embodiment 1 of the present disclosure, the detection unit 33 detects the unauthorized communication based on a value obtained when the difference is shifted from decrease to increase in the change.

By focusing on the fact that the above-described value obtained when an unauthorized packet intrudes is different from the above-described value obtained when an unauthorized packet does not intrude, unauthorized communication may easily be detected.

Furthermore, in the switching device according to Embodiment 1 of the present disclosure, the detection unit 33 determines that the unauthorized communication occurs if the differences increases before the differences reaches zero with its decreasing, in the change.

By such a configuration, the time from when an unauthorized packet intrudes to when it is determined that unauthorized communication occurs can be shortened, so that a delay of detection can be prevented.

Moreover, in the switching device according to Embodiment 1 of the present disclosure, the counting unit 32 resets the numbers of relayed packets if the unauthorized communication is detected by the detection unit 33.

By such a configuration, erroneous determination of incorrectly determining that unauthorized communication occurs even though unauthorized communication does not occur can be prevented.

Additionally, in the switching device according to Embodiment 1 of the present disclosure, the packets are transmitted to the target function units in a predetermined order. The counting unit 32 resets the numbers of relayed packets when one of the target function units to which one of the packets is to be relayed is switched from one target function unit to another target function unit after the unauthorized communication is detected by the detection unit 33.

Hence, the numbers of relayed packets are reset at a timing when the sequence of the target function units is switched and whereby, detection processing can be restarted in the middle of the order. That is, the detection processing can be restarted from a substantial initial state.

Another embodiment of the present disclosure will be described below with reference to the drawings thereof. It is noted that the same or corresponding parts are denoted by the same reference codes in the drawings, and detailed description thereof will not be repeated.

Embodiment 2

The present embodiment relates to a switching device that automatically acquires conditions of the packets to be counted by the counting unit in addition to the switching device according to Embodiment 1. The details other than the following description are similar to those of the switching device in Embodiment 1.

[Configuration of Switching Device 102]

Figure 14:
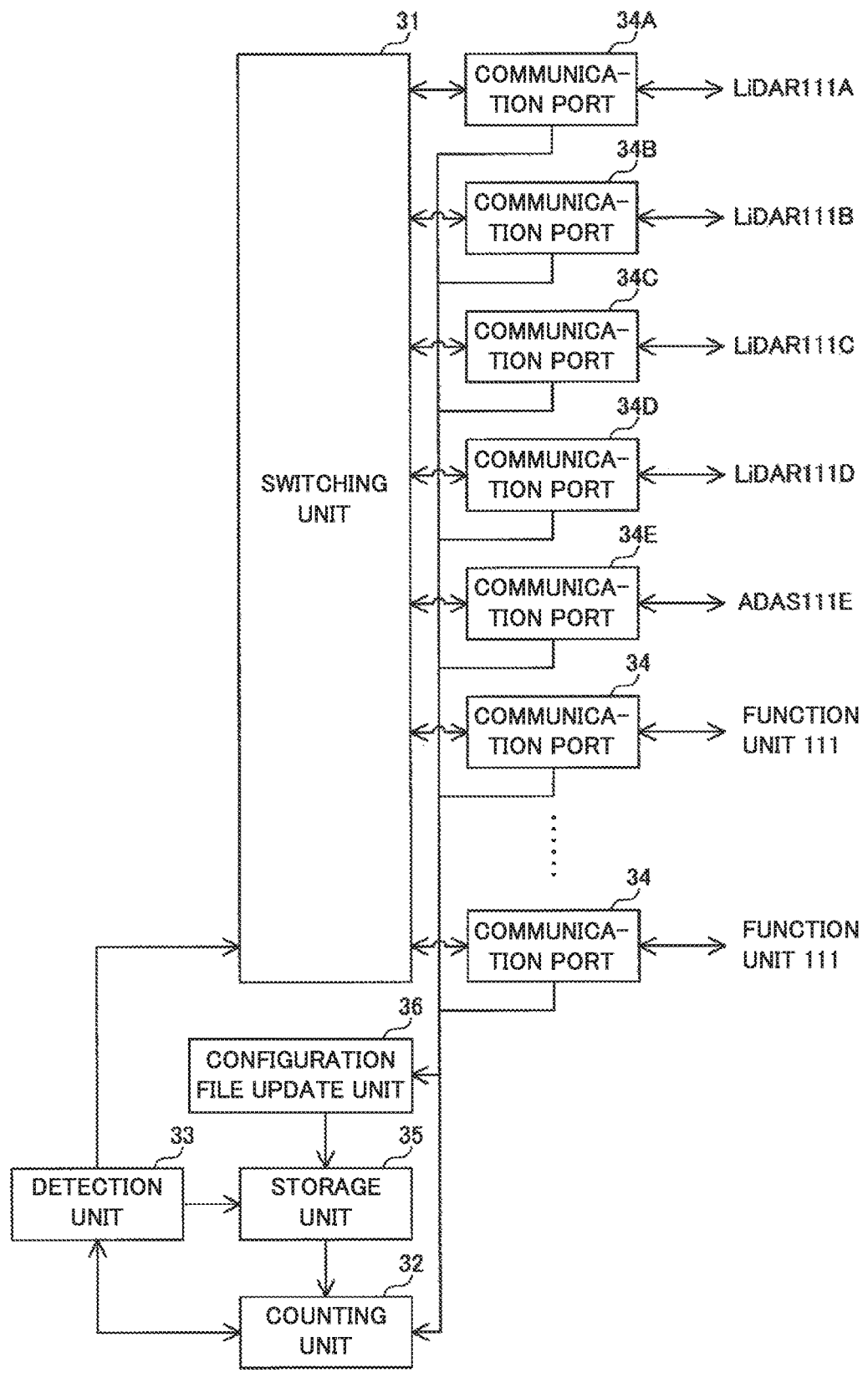
FIG. 14 illustrates the configuration of a switching device in an on-vehicle communication system according to Embodiment 2 of the present disclosure.

FIG. 14 illustrates the configuration of a switching device in an on-vehicle communication system according to Embodiment 2 of the present disclosure.

Referring to FIG. 14, a switching device 102 further includes a configuration file update unit 36 in addition to the switching device 101 illustrated in FIG. 2.

A switching unit 31, a counting unit 32, a detection unit 33, communication ports 34 and a storage unit 35 in the switching device 102 operate similarly to the switching unit 31, the counting unit 32, the detection unit 33, the communication ports 34 and the storage unit 35 in the switching device 101 illustrated in FIG. 2, respectively.

The configuration file update unit 36 monitors Ethernet frames transmitted and received to and from the respective communication ports 34.

More specifically, for each of the communication ports 34 to be monitored, for example, the configuration file update unit 36 monitors a corresponding port number as well as a source IP address, a destination IP address, a communication protocol number, a source port number and a destination port number of an UDP packet or a TCP packet, and a source MAC address and a destination MAC address that are included in the Ethernet frames to be transmitted and received by the communication port 34.

The configuration file update unit 36 creates a condition for specifying packets (hereinafter, also referred to as a condition inclusive packet) to be relayed to multiple function units 111 of the same type based on the monitoring result.

Specifically, the configuration file update unit 36 specifies multiple packets that are the same in the source IP address and the destination port number while being different in the destination IP address as condition inclusive packets.

More specifically, the configuration file update unit 36 specifies the target packets A-D as condition inclusive packets based on the source IP address, the destination IP address and the destination port number that are included in the packets to be respectively transmitted to the LiDARs 111A-111D for the communication ports 34A-34D.

The configuration file update unit 36 creates conditions CA-CD based on the port number of the communication port 34 to which the condition inclusive packet is to be transmitted and the source IP address and the destination port number that are included in the condition inclusive packet, and writes the created conditions CA-CD into the configuration file of the storage unit 35.

The configuration and the operation other than the above description are similar to those of the switching device according to Embodiment 1, and the detailed description thereof will not be described here.

Next, another embodiment of the present disclosure will be described with reference to the drawings thereof. It is noted that the same or corresponding parts are denoted by the same reference codes in the drawings, and detailed description thereof will not be repeated.

Embodiment 3

The present embodiment relates to an on-vehicle communication system for detecting unauthorized communication in an on-vehicle network in compliance with a CAN communication standard in addition to the on-vehicle communication system according to Embodiment 1. The details other than the following description is similar to those of the on-vehicle communication system according to Embodiment 1.

[Configuration and Basic Operation]

Figure 15:
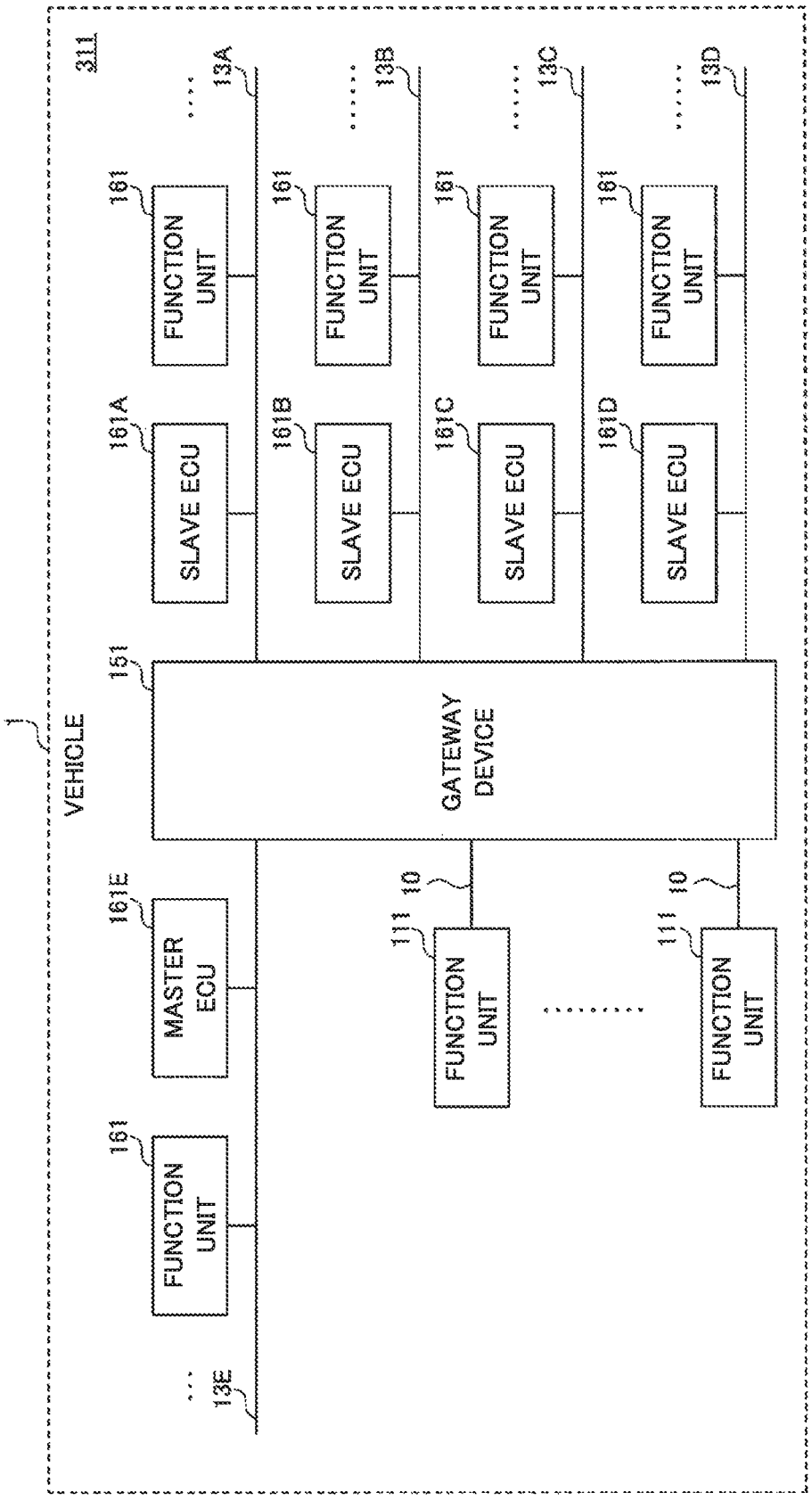
FIG. 15 illustrates the configuration of an on-vehicle communication system according to Embodiment 3 of the present disclosure.

FIG. 15 illustrates the configuration of the on-vehicle communication system according to Embodiment 3 of the present disclosure.

Referring to FIG. 15, an on-vehicle communication system 311 includes a gateway device 151 and multiple function units 161. The on-vehicle communication system 311 is mounted on a vehicle 1.

In this example, slave electronic control units (ECUs) 161A, 161B, 161C and 161D are examples of target function units. A master ECU 161E is one example of the function units 161. The slave ECUs 161A, 161B, 161C and 161D respectively have 21, 22, 23 and 24 as CAN node IDs, which are examples of addresses.

Hereafter, each of the slave ECUs 161A, 161B, 161C and 161D is also referred to as a slave ECU 161.

More specifically, the slave ECUs 161A, 161B, 161C and 161D are respectively provided in the wheels at the left front, the right front, the left rear and the right rear of the vehicle 1 of their own, for example.

The slave ECUs 161A-161D operate according to an instruction from the master ECU 161E, for example, and includes devices of the same type such as measurement modules or the like for each measuring the number of rotations of a wheel.

The slave ECU 161 measures the number of rotations of a corresponding wheel in response to a measurement request from the master ECU 161E, for example.

Note that the function unit 161 may be an engine control device, an automatic transmission (AT) control device, a hybrid electric vehicle (HEV) control device, a brake control device, a chassis control device, a steering control device, a measuring instrument display control device, a theft detection device and so on other than the slave ECU 161 and the master ECU 161E.

In the on-vehicle network, the connection between a gateway device 151 and the function units 161 are fixed, for example.

The gateway device 151 is connected to each of the function units 161 through a bus (hereinafter, referred to as a CAN bus) 13 in compliance with the CAN communication standard, for example.

The gateway device 151 and multiple function units 161 are connected to the CAN bus 13.

Specifically, the slave ECUs 161A, 161B, 161C, 161D are respectively connected to CAN buses 13A, 13B, 13C, 13D each serving as CAN buses 13. The master ECU 161E is connected to the CAN bus 13E serving as a CAN bus 13.

The gateway device 151 and each of the function units 161 can communicate with each other using the CAN bus 13, for example.

More specifically, the gateway device 151 and the function unit 161 can exchange information using messages in compliance with the CAN communication standard, for example.

Furthermore, the gateway device 151 is connected to the multiple function units 111 through Ethernet cables 10, for example.

The gateway device 151 performs relay processing for relaying data between the multiple function units 111 and 161 mounted on the vehicle 1.

More specifically, the gateway device 151 performs relay processing of information between the function units 161 respectively connected to the different CAN buses 13, relay processing of information between the function units 111 and relay processing between the function unit 111 and the function unit 161, for example.

Concretely, the gateway device 151 relays messages transmitted from the master ECU 161E to each of the slave ECUs 161A-161D, for example. Furthermore, the gateway device 151 relays messages from each of the slave ECUs 161A-161D to the master ECU 161E.

More specifically, the master ECU 161E creates four messages addressed to the slave ECUs 161A, 161B, 161C and 161D for each predetermined acquisition period, for example. These four messages respectively include measurement requests.

Hereafter, messages addressed to the slave ECUs 161A, 161B, 161C and 161D are also respectively referred to as target messages MA, MB, MC and MD. Furthermore, each of the target messages MA, MB, MC and MD may also be referred to as a target message.

The target messages MA, MB, MC and MD include respective message IDs indicating that the destinations are the slave ECUs 161A, 161B, 161C and 161D, respectively.

In this example, the master ECU 161E transmits the respective target messages MA, MB, MC and MD in this order to the slave ECUs 161A, 161B, 161C and 161D via the gateway device 151.

The slave ECU 161A receives the target message from the master ECU 161E, and acquires the measurement request included in the received target message.

The slave ECU 161A then measures the number of rotations of the corresponding wheel according to the acquired measurement request and creates a message including the measurement result.

Each of the slave ECUs 161B, 161C and 161D also performs similar processing to the slave ECU 161A.

The target function units transmit messages to a common function unit 161, for example. In this example, the slave ECUs 161A, 161B, 161C and 161D transmit messages each including the measurement result to the master ECU 161E.

[Configuration of Gateway Device 151]

Figure 16:
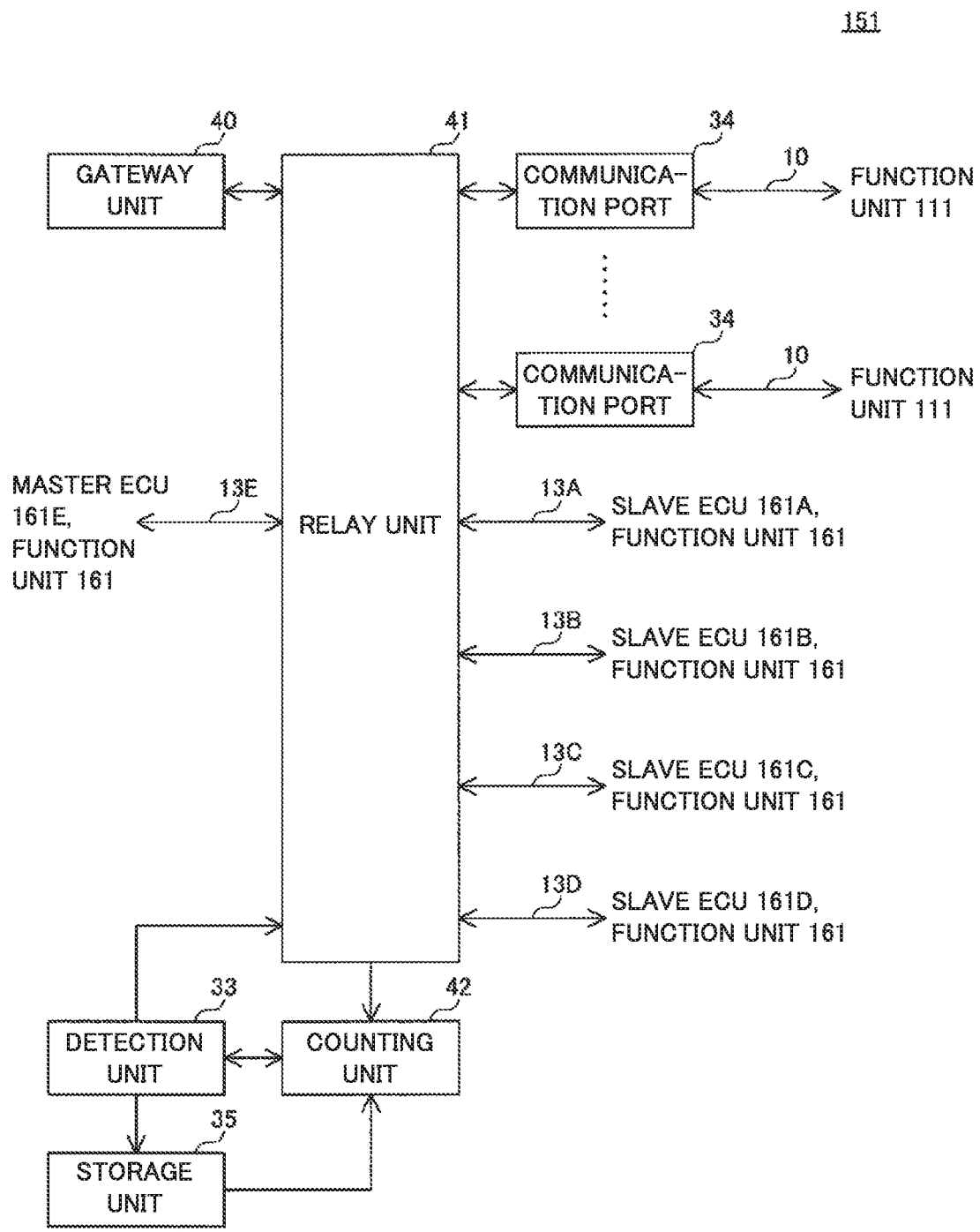
FIG. 16 illustrates the configuration of a gateway device in the on-vehicle communication system according to Embodiment 3 of the present disclosure.

FIG. 16 illustrates the configuration of the gateway device of the on-vehicle communication system according to Embodiment 3 of the present disclosure.

Referring to FIG. 16, the gateway device (relay device) 151 is provided with a detection unit 33, multiple communication ports 34, a storage unit 35, a gateway unit 40, a relay unit 41 and a counting unit 42.

The detection unit 33, the communication ports 34 and the storage unit 35 in the gateway device 151 operate similarly to the detection unit 33, the communication ports 34 and the storage unit 35 in the switching device 101 illustrated in FIG. 2, respectively.

The CAN buses 13A-13E are connected to the relay unit 41. The communication ports 34 are connected to the respective function units 111 via Ethernet cables 10.

The gateway unit 40 relays data by performing protocol conversion between the communication protocol for CAN and the communication protocol for the Ethernet.

More specifically, when receiving a message from the relay unit 41, the gateway unit 40 performs protocol conversion on the received message to thereby create an Ethernet frame from this message, and outputs the created Ethernet frame to the relay unit 41.

Moreover, when receiving the Ethernet frame from the relay unit 41, the gateway unit 40 performs protocol conversion on the received Ethernet frame to create a message from this Ethernet frame and outputs the created message to the relay unit 41.

The relay unit 41 holds an ID correspondence table showing the correspondences between message IDs and CAN node IDs as well as an output destination correspondence table showing the correspondences between CAN node IDs as well as MAC addresses and output destinations, for example. Here, the output destination is the CAN bus 13, the communication port 34 and the gateway unit 40.

The contents of the ID correspondence table and the output destination correspondence table are set in advance by the user, for example, based on the fixed connection as described above.

When receiving a message from the function unit 161 via the CAN bus 13, the relay unit 41 outputs the received message to the gateway unit 40 if the received message is a message that needs protocol conversion.

Furthermore, the relay unit 41 acquires a message ID from the message if the received message is a message that does not need protocol conversion.

The relay unit 41 refers to the ID correspondence table, and specifies a CAN node ID corresponding to the acquired message ID. The relay unit 41 then refers to the output destination correspondence table, and specifies a CAN bus 13 as an output destination corresponding to the specified CAN node ID. The relay unit 41 then outputs the received message to the specified CAN bus 13.

The relay unit 41 performs processing similarly to the processing performed on the message that does not need protocol conversion, on the message received from the gateway unit 40.

Furthermore, when receiving an Ethernet frame via the communication port 34, the relay unit 41 outputs the received Ethernet frame to the gateway unit 40 if the received Ethernet frame is an Ethernet frame that needs protocol conversion.

Moreover, the relay unit 41 acquires a destination MAC address from this Ethernet frame if the received Ethernet frame is an Ethernet frame that does not need protocol conversion.

The relay unit 41 refers to the output destination correspondence table and specifies another communication port 34 as an output destination corresponding to the specified destination MAC address. The relay unit 41 then outputs the received Ethernet frame to the specified communication port 34.

The relay unit 41 performs processing similarly to the processing performed on the message that does not need protocol conversion on the message received from the gateway unit 40 as well.

In the storage unit 35, a configuration file, which is created by the user, for example, including conditions of messages to be counted by the counting unit 32 is registered.

In the configuration file, 21-24 are registered as a range in which the CAN node IDs of the function units 161 as destinations are included, for example. In this example, the configuration file includes conditions CMA-CMD. The conditions CMA, CMB, CMC and CMD are that message IDs are No. 11, No. 12, No. 13 and No. 14, respectively.

The No. 11, No. 12, No. 13 and No. 14 are here examples of message IDs included in the respective target messages MA, MB, MC and MD.

The conditions CMA-CMD are created as described below, for example. For example, the administrator respectively extracts 11-14 as message IDs corresponding to the CAN node IDs of 21-24 based on the ID correspondence table. The administrator creates the conditions CMA-CMD based on the extracted message IDs.

The counting unit 42 counts the number of packets relayed to the target function unit in the relay processing, that is, the number of relayed messages that are the number of messages in this example.

More specifically, the counting unit 42 counts the number of messages to be transmitted and received by the relay unit 41 according to the contents of the configuration file registered in the storage unit 35.

In this example, the counting unit 42 counts the numbers of target messages to be relayed to the CAN buses 13A, 13B, 13C and 13D using the respective conditions CMA, CMB, CMC and CMD included in the configuration file.

Additionally, the counting unit 32 also counts the number of unauthorized intrusion messages disguised as any one of the target messages MA, MB, MC and MD for making DoS attack that is transmitted from the function unit 161 to the slave ECU 161.

More specifically, the counting unit 42 holds four transmission counters respectively counting count values NA, NB, NC and ND, for example.

Here, the count value NA indicates the sum of the number of target messages MA and the number of unauthorized intrusion messages disguised as the target messages MA. The count value NB indicates the sum of the number of target messages MB and the number of unauthorized intrusion messages disguised as the target messages MB. The count value NC indicates the sum of the number of target messages MC and the number of unauthorized intrusion messages disguised as the target messages MC. The count value ND indicates the sum of the number of target messages MD and the number of unauthorized intrusion messages disguised as the target messages MD.

The counting unit 42 increments the count value of the corresponding transmission counter when any one of the target messages MA, MB, MC and MD or an unauthorized intrusion message is relayed by the relay unit 41 in the same manner as FIGS. 3-12.

The detection unit 33 monitors the count value obtained by the counting unit 42 and detects unauthorized communication with a target function unit based on the maximum value and the minimum value of the numbers of relayed messages counted by the counting unit 42.

Specifically, the detection unit 33 detects unauthorized communication based on the temporal change of the difference Dif between the maximum value and the maximum value of the numbers of relayed messages in the same manner as FIGS. 3-12, for example.

As described above, the gateway device according to Embodiment 3 of the present disclosure performs relay processing of relaying data between the plurality of function units 161 mounted on the vehicle 1. The counting unit 42 counts each of the numbers of relayed messages that are the numbers of messages relayed to the respective target function units being the plurality of function units 161 of a same type in the relay processing. The detection unit 33 monitors a count value of the numbers counted by the counting unit 42 and detects unauthorized communication with the target function units based on the maximum value and the minimum value of the numbers of relayed messages counted by the counting unit 42.

The target function units are of the same type, and it is conceivable that message relayed to the respective target function units are the same in number. The numbers of relayed messages transmitted to the respective target function units are counted, and unauthorized communication with the target function units is detected based on the maximum value and the minimum value of the counted numbers of relayed messages. By such a configuration, unauthorized communication, such as a Slow Read DoS attack, that is difficult to be detected in the function unit 161 located at the end in the on-vehicle network can be detected based on variation in number of relayed messages that are to be the same. Furthermore, the numbers of relayed messages are counted, and by such a configuration, unauthorized communication can be detected regardless of a communication protocol. More specifically, even if the messages to be relayed includes a message in a CAN not using TCP connection, a Slow Read DoS attack can be detected. In addition, the gateway device 151 is operated irrespective of a running state of the vehicle 1, and by such a configuration, unauthorized communication can be detected in the state where the vehicle 1 is running as well in addition to the state where the vehicle 1 is parked. Accordingly, good security can be provided in the on-vehicle network.

The other configuration and operation are similar to those in the on-vehicle communication system according to Embodiment 1, and the detailed description thereof will not be repeated here.

Note that parts or all of the components and operation of the devices according to Embodiments 1 to 3 of the present disclosure may appropriately be combined with each other.

It is to be understood that the embodiments disclosed here are illustrative in all respects and not restrictive. The scope of the present disclosure is defined by the appended claims, not the above description and all changes that fall within the meanings and the bounds of the claims, or equivalence of such meanings and bounds are intended to be embraced by the claims.

The above description includes features of the clause described below.

[Clause 1]

A relay device that performs relay processing of relaying data between a plurality of function units mounted on a vehicle, comprising:

a counting unit that counts each of the numbers of relayed packets that are the numbers of packets relayed to respective target function units being the plurality of function units of a same type in the relay processing; and a detection unit that monitors a count value of the numbers counted by the counting unit and detects unauthorized communication with the target function units based on a maximum value and a minimum value of the numbers of relayed packets counted by the counting unit, wherein the relay device is a switching device or a gateway device, the counting unit counts, in the relay processing, the numbers of relayed packets that are relayed from an advanced driver assistance system (ADAS) being a common function unit to a plurality of light detection and rangings (LiDARs), millimeter wave sensors or cameras, or counts the numbers of relayed messages being the number of messages that are relayed from a master electronic control unit (ECU) being the common function unit to a plurality of slave ECUs, and the packets or the messages are packets or messages transmitted from the common function unit to the target function units by the same number.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A relay device that performs relay processing of relaying data between a plurality of function units mounted on a vehicle, comprising:
a memory storing a predetermined program;
a computation processing unit coupled to the memory and configured to read the program from the memory to cause the relay device to perform operations comprising:
counting each of the numbers of relayed packets being the numbers of packets relayed to respective target function units being the plurality of function units of a same type in the relay processing; and
monitoring a counted count value and detecting unauthorized communication with the target function units based on a maximum value and a minimum value of the numbers of relayed packets that are counted.

2. The relay device according to claim 1, wherein the packets are transmitted to the target function units in order, and
the detecting operation comprises detecting unauthorized communication with the target function units other than a last one of the target function units in the order.

3. The relay device according to claim 1, wherein the detecting operation comprises detecting the unauthorized communication if two or more packets are relayed to any one of the target function units in unauthorized communication.

4. The relay device according to claim 1, wherein the target function units are function units that transmit packets to a common function unit being one of the plurality of function units.

5. The relay device according to claim 1, wherein the target function units are function units satisfying at least any one of conditions that destination port numbers for the packets are same, that addresses are included in a predetermined range, that identifiers of a network to which the target function units belong are same and the target function units are defined by predetermined definition information.

6. The relay device according to claim 1, wherein the target function units include devices of a same type.

7. The relay device according to claim 1, wherein the detecting operation comprises detecting the unauthorized communication based on a change in a difference between the maximum value and the minimum value.

8. The relay device according to claim 7, wherein the detecting operation comprises detecting the unauthorized communication based on a value obtained when the difference is shifted from decrease to increase in the change.

9. The relay device according to claim 8, wherein the detecting operation comprises determining that the unauthorized communication occurs if the differences increases before the differences reaches zero with its decreasing, in the change.

10. The relay device according to claim 1, wherein the counting operation comprises resetting the numbers of relayed packets if the unauthorized communication is detected by the detecting operation.

11. The relay device according to claim 1, wherein the packets are transmitted to the target function units in a predetermined order, and
the counting operation comprises resetting the numbers of relayed packets when one of the target function units to which one of the packets is to be relayed is switched from one target function unit to another target function unit after the unauthorized communication is detected by the detecting operation.

12. A detection method for a relay device that performs relay processing of relaying data between a plurality of function units mounted on a vehicle, comprising steps of:
counting each of the numbers of relayed packets being the numbers of packets relayed to respective target function units being the plurality of function units of a same type in the relay processing; and
monitoring a counted count value and detecting unauthorized communication with the target function units based on a maximum value and a minimum value of the numbers of relayed packets that are counted.

* * * * *